United States Patent [19]

Fergason

[11] Patent Number: 4,878,741
[45] Date of Patent: Nov. 7, 1989

[54] LIQUID CRYSTAL COLOR DISPLAY AND METHOD

[75] Inventor: James L. Fergason, Atherton, Calif.

[73] Assignee: Manchester R & D Partnership, Pepper Pike, Ohio

[21] Appl. No.: 942,548

[22] PCT Filed: Sep. 10, 1986

[86] PCT No.: PCT/US86/01863
§ 371 Date: Dec. 16, 1986
§ 102(e) Date: Dec. 16, 1986

Related U.S. Application Data

[63] Continuation-in-part of Ser. No. 707,486, Mar. 1, 1985, abandoned.

[30] Foreign Application Priority Data

Sep. 10, 1986 [WO] PCT Int'l Appl. .................. PCT/US86/01863

[51] Int. Cl.⁴ .............................................. G02F 1/13
[52] U.S. Cl. ................. 350/339 F; 350/334; 350/336; 350/349
[58] Field of Search ..................... 350/339 F, 334, 336, 350/349, 332

[56] References Cited

U.S. PATENT DOCUMENTS

| | | | |
|---|---|---|---|
| 2,777,011 | 1/1957 | Marks | 350/88 |
| 2,897,544 | 3/1959 | Marks | 156/894 |
| 3,300,436 | 1/1967 | Marks et al. | 254/401 |
| 3,322,435 | 5/1967 | Williams | 350/331 R |
| 3,600,060 | 8/1971 | Churchill | 350/331 R |
| 3,627,924 | 12/1971 | Fleming et al. | 358/241 |
| 3,636,244 | 1/1972 | Smierciak et al. | 350/15 |
| 3,639,685 | 2/1972 | Morio | 350/503 |
| 3,666,881 | 5/1972 | Stein | 350/339 F |
| 3,720,623 | 3/1973 | Cartmell et al. | 428/282 |
| 3,840,695 | 10/1974 | Fischer | 350/352 |

(List continued on next page.)

FOREIGN PATENT DOCUMENTS

| | | |
|---|---|---|
| 0157489 | 9/1985 | European Pat. Off. . |
| 2139537 | 1/1973 | France . |
| 52-45894 | 4/1977 | Japan . |
| 53-34496 | 3/1978 | Japan . |
| 53-34542 | 3/1978 | Japan . |
| 57-192928 | 11/1982 | Japan . |
| 2003290 | 3/1979 | United Kingdom . |

OTHER PUBLICATIONS

Bocher et al, Applied Physics Letters, vol. 25, No. 4, Aug. 15, 1974, pp. 186–188, "Frequency addressed liquid crystal field effect".

(List continued on next page.)

Primary Examiner—Stanley D. Miller
Assistant Examiner—Hug K. Mai
Attorney, Agent, or Firm—Renner, Otto, Boisselle & Sklar

[57] ABSTRACT

A liquid crystal color display (20) provides a transmitted light output of one or more colors, black, and/or white, as a function of incident light and controlled energization or not of respective optically serially positioned liquid crystal color layers (2, 3, 4) and/or multicolor composite liquid crystal color layer(s) in the display. Plural optically serially arranged volumes (21) of operationally nematic liquid crystal material (25) having different optical characteristics, e.g. being dyed with different pleochroic dyes (28), may be selectively aligned or not with respect to an electric field to determine optical output of the device in a subtractive color mode. Exemplary colors of pleochroic dye include yellow, cyan and magenta, and black dye may be used to control saturation or hue. Non-pleochroic dye also may be used in one or more layers of the liquid crystal color display to filter or to color light transmitted therethrough thereby to cooperate with the pleochroic dye to provide a final color output. Additionally, individual pixel-like areas (72, 73, 74) of the liquid crystal color display may be so positioned in proximity to each other to operate in a color additive mode. Techniques for discriminating voltage and/or frequency enable a multicolor response using only a single pair of electrodes. Using cross over liquid crystal material having positive and negative dielectric anisotropy characteristics as a function of frequency of applied signal, multiplex driving of the liquid crystal color display is facilitated.

79 Claims, 6 Drawing Sheets

U.S. PATENT DOCUMENTS

| | | | |
|---|---|---|---|
| 3,864,022 | 2/1975 | Moriyhma | 350/389 |
| 4,009,934 | 3/1977 | Goodwin | 350/346 |
| 4,035,690 | 7/1977 | Roeber | 340/703 |
| 4,048,358 | 9/1977 | Shanks | 428/1 |
| 4,211,473 | 7/1980 | Shanks | 350/337 |
| 4,241,339 | 12/1980 | Ushiyhma | 350/331 R |
| 4,391,491 | 7/1983 | Freer et al. | 350/341 |
| 4,396,251 | 8/1983 | Mukch | 350/349 |
| 4,401,537 | 8/1983 | Chern et al. | 204/159.11 |
| 4,435,047 | 3/1984 | Fergason | 350/334 |
| 4,448,490 | 5/1984 | Shibnya et al. | 350/335 |
| 4,460,248 | 7/1984 | Shirai | 350/335 |
| 4,470,668 | 9/1984 | Inoue et al. | 350/343 |
| 4,485,376 | 11/1984 | Noble | 340/716 |
| 4,556,289 | 12/1985 | Fergason | 350/350 R |
| 4,581,608 | 4/1986 | Aftergut et al. | 350/332 |
| 4,596,445 | 6/1986 | Fergason | 350/339 F |
| 4,606,611 | 3/1986 | Fergason | 350/354 |
| 4,610,509 | 9/1986 | Sorinachi et al. | 350/330 F |
| 4,613,207 | 9/1986 | Fergason | 350/331 R |
| 4,616,903 | 10/1986 | Fergason | 350/334 |
| 4,708,441 | 11/1987 | Petrzilka et al. | 350/346 |

OTHER PUBLICATIONS

Gerber, Paul R., Applied Physics Letters, vol. 44, No. 9, May 1, 1984, pp. 932–934, "Two-frequency addressing of a cholesteric texture change electro-optical effect".

Sato et al, Applied Physics Letters, vol. 37, No. 8, Oct. 15, 1980, pp. 677–679, "Multicolor fluorescent liquid-crystal display concepts".

Suzuki et al, Procedings of the SID, vol. 22, No. 4, 1981, pp. 293–297.

"A Multiplexed phase-Change-Type Color LCD".

Urisu et al, Applied Optics, vol. 20, No. 4, Feb. 15, 1981, pp. 633–635, "Liquid crystal display device for total reflection switching with fluorescent dye addition".

Van Doorn et al, Journal of Applied Physics, vol. 50, No. 2, Feb. 1979, pp. 1066–1070, "Two-frequency 100-line addressing of a relfective twisted-nematic liquid-crystal matrix display".

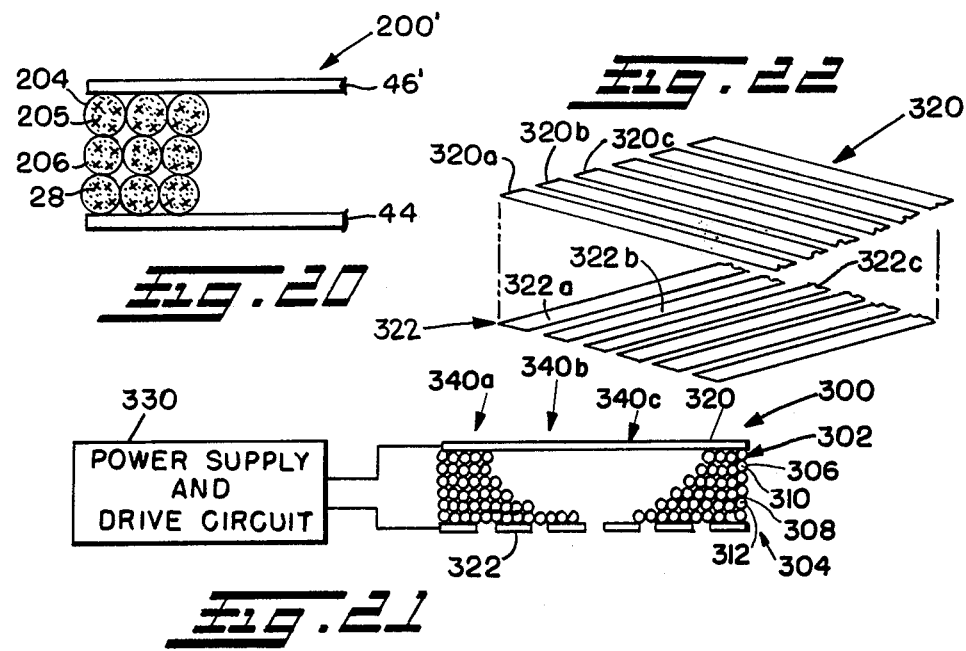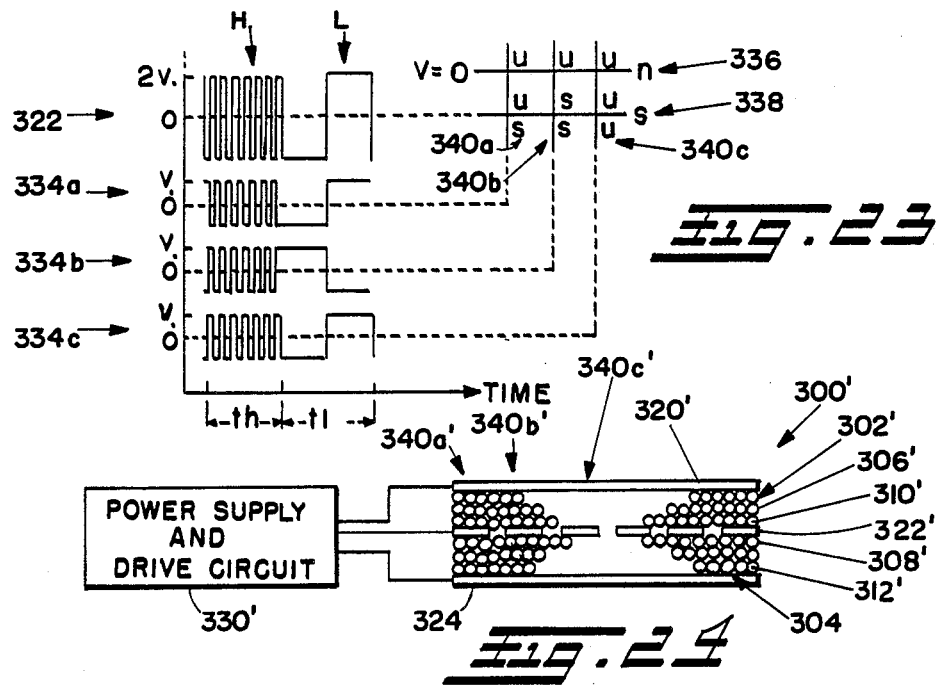

LIQUID CRYSTAL COLOR DISPLAY AND METHOD

This application is a continuation-in-part of copending U.S. patent application Ser. No. 707,486, filed Mar. 1, 1985 now abandoned.

CROSS-REFERENCES TO RELATED PATENTS

Reference is made to U.S. Pats. No. 4,435,047, 4,579,423, 4,606,611, 4,596,445, and 4,556,289, and commonly assigned applications Ser. No. 477,242, filed Mar. 21, 1983: No. 480,461, filed Mar. 30, 1983; No. 585,883, filed Mar. 2, 1984; and No. 608,135, filed May 8, 1984, the entire disclosures of which hereby are incorporated by reference.

TECHNICAL FIELD

The present invention relates generally, as indicated, to liquid crystal color displays and methods, and, more particularly, to the use of substractive color principles in a multi-layer and/or multicolor liquid crystal display to obtain selected color outputs that may be used to provide a constant or static output image and/or a dynamic or moving image, for example analogous to that produced by a color television. The invention also relates to the scanning, e.g. in the sense of selectively addressing, of respective multicolor portions of a liquid crystal color display apparatus to enable the multiple coloring of the light output, e.g. like a color television picture tube.

BACKGROUND

Liquid crystal material currently is used in a wide variety of devices, including, for example, optical devices such as visual displays. A property of liquid crystal enabling use in visual displays is the ability to scatter and/or to absorb light when the liquid crystal is in a random alignment (sometimes referred to herein as distorted alignment) and the ability to transmit light when the liquid crystal is in an ordered alignment (sometimes referred to herein as parallel alignment).

Examples of electrically responsive liquid crystal material and use thereof are found in the above patent(s) and applications and in U.S. Pat. No. 3,322,485. Certain types of liquid crystal material are responsive to a prescribed input, such as temperature or electrical input (e.g. electric field, voltage, frequency), changing the optical characteristics and/or the random or ordered alignment of the liquid crystal material, in response to such prescribed input.

Currently there are three categories of liquid crystal materials, namely choleteric, nematic and smectic. The present invention preferably uses nematic liquid crystal material or a combination of nematic and some cholesteric type. More specifically, the liquid crystal material preferably is operationally nematic, i.e. it acts as nematic material and not as the other types. Operationally nematic means that in the absence of external fields structural distortion of the liquid crystal is dominated by the orientation of the liquid crystal at its boundaries rather than by bulk effects, such as very strong twists, as in cholesteric material, or layering, as in smectic material. The operationally nematic material may include nematic and cholesteric liquid crystal materials. Thus, for example, operationally nematic liquid crystal with chiral ingredients, which induce a tendency to twist but cannot overcome the effects of boundary alignment, still would be operationally nematic.

Hereinbelow the liquid crystal of the invention primarily will be referred to interchangeably and equivalently as nematic or as operationally nematic. Although various characteristics of the various liquid crystal materials are described in the prior art, one known characteristic is that of reversibility, e.g. of physical, structural, optical and/or electrical properties, as a prescribed input is applied or removed. Particularly, nematic liquid crystal material is known to be reversible, but cholesteric material ordinarily is not reversible.

Usually liquid crystal material is anisotropic both optically (birefringence) and, for example in the case of nematic material, electrically. The optical anisotropy is manifest by the scattering or absorption, especially when pleochroic dye is in solution with the liquid crystal material, of light when the liquid crystal material is in random alignment, and the transmission of light, especially in a particular direction related to an axis of the liquid crystal structure, through the liquid crystal material (and pleochroic dye, if used) when it is in ordered alignment. The electrical anisotropy may be a relationship between the dielectric constant or dielectric coefficient with respect to the alignment of the liquid crystal material and also may be electrical frequency dependent.

The preferred liquid crystal material should have a positive dielectric anisotropy; or, as is described below, the liquid crystal may have both positive and negative dielectric anisotropy, e.g. as a function of frequency.

Pleochroic dye also has been used in the past in a mixture with operationally nematic liquid crystal contained in plural volumes in a containment or support medium. Examples are given in several of the applicant's above-identified patent(s) and applications.

In the past, displays using liquid crystal material have had to be relatively small in size for a variety of reasons. Using applicant's invention of providing plural volumes of liquid crystal material in a support or containment medium, relatively large- and small-size displays can be made and operated successfully. The volumes may be discrete ones, may be interconnected with one or more other volumes, or may include both discrete and interconnected ones. Moreover, use of operationally nematic liquid crystal material enables operational response as a function of electrical input and also enables relatively expeditious and efficient operation, for example in response to the application or removal of an electric field.

As used herein with respect to the present invention, encapsulated liquid crystal material, volumes of liquid crystal material in a support or containment medium, etc., means liquid crystal material in capsules, cells or the like formed in or included in a containment medium. The capsules or cells may be discrete, i.e. not fluidically connected to any others, or may be fluidically interconnected with one or more capsules or cells. (The terms volumes, capsules, cells, etc. may be used interchangeably and equivalently herein.) Such liquid crystal material and containment medium may form an emulsion, preferably a stable one, that is able to set or to cure to a relatively stable structure in which the plural capsules, cells or volumes in the structure contain liquid crystal material and preferably also pleochroic dye. Various methods for making and using such encapsulated liquid crystal material and apparatus associated therewith are disclosed herein and in applicant's above patent(s) and applications.

In one preferred embodiment of the invention the containment medium is formed of a latex or latex type material, for example as is disclosed in copending U.S. patent application Ser. No. 591,433, filed Mar. 20, 1984, the entire disclosure of which is incorporated by reference. In another preferred embodiment the containment medium is polyvinyl alcohol. Epoxy is another example of a containment medium useful in the invention. Other containment media that cause operation generally along the lines described in further detail below also may be used.

A flat screen television system in which an electroluminescent array is repetitively scanned is disclosed in U.S. Pat. No. 3,627,924. Moreover, U.S. Pat. No. 3,636,244 and 3,639,685 disclose signal processing circuits for color television picture tubes. The disclosures of these patents are hereby incorporated by reference.

BRIEF SUMMARY OF INVENTION

Briefly, the invention relates to the producing of a colored output, preferably a multicolored output, by a liquid crystal device that includes pleochroic dye. The liquid crystal device is in the form of a liquid crystal color display that includes at least two different groups of volumes of dyed liquid crystal (for example, operationally nematic liquid crystal and pleochroic dye), the volumes of one group being fluidically and/or chemically separated from the volumes of the other group to isolate the respective dyed liquid crystal of each group from that of the other(s), and the dyed liquid crystal of each group preferably including pleochroic dye of a different respective color. The groups of volumes of dyed liquid crystal material may be in separate respective layers of plural volumes (hereinafter referred to as liquid crystal color layers) or the volumes of two or more groups may be mixed substantially homogeneously while maintaining the respective dyed liquid crystal materials isolated from the other differently dyed liquid crystal material. Such mixed volumes embodiment is referred to below as the distributed volumes or distributed volumes layer embodiment whether the volumes are mixed substantially or less than substantially homogeneously. The volumes of dyed liquid crystal material may be in the form of discrete capsules that are isolated totally from other capsules or that are fluidically interconnected to one or more capsules of the same group. Alternatively, the volumes may be in the form of an emulsion of the dyed liquid crystal in a containment medium, in the form of a stable matrix of the dyed liquid crystal in a containment medium, and so on.

Whether the groups of dyed liquid crystal volumes are in separate liquid crystal color layers of different respective colors or are in a homogeneous distribution of the volumes (distributed volumes embodiment), the layers and/or volumes are arranged in optical serial relation so that incident light transmitted through the display preferably passes through all or at least several of the liquid crystal color layers or differently dyed volumes. Respective color layers or portions thereof or groups of homogeneously distributed volumes may be selectively energized to substantial optical transparency or deenergized to color or to filter light transmitted or passing therethrough. Optical operation of the liquid crystal color display, then, follows the principles of subtractive color filter operation, as is described in greater detail below.

The dyed liquid crystal material in each volume includes operationally nematic liquid crystal material and pleochroic dye, which tends to align according to the structure of the liquid crystal material. Although the structure of operationally nematic liquid crystal material generally tends to assume a straight line configuration, the walls defining the volumes in which the liquid crystal material and pleochroic dye is contained tend to distort the natural liquid crystal structure to a curvilinear alignment in the absence of a prescribed input, in the preferred embodiment an electric field. The curvilinearly aligned or distorted liquid crystal structure may be in a direction generally parallel to the wall(s) defining the volume(s) or may be generally normal to such wall(s). Such curvilinear alignment may be referred to as a nematic curvilinearly aligned phase of the liquid crystal or liquid crystal structure and in such phase the liquid crystal material and dye tend to affect incident light. More specifically, the dye tends to color the light or to filter out a particular color from the light. On the other hand, in the presence of a prescribed input, preferably an electric field, the liquid crystal structure tends to align with respect to the field, and the pleochroic dye structure aligns generally in parallel with the liquid crystal structure; in such parallel aligned or field-on condition or phase the amount of coloring or filtering of light transmitted through the particular liquid crystal color layer is reduced, preferably is minimized, and most preferably the liquid crystal color layer becomes substantially optically transparent.

In a device utilizing two differently dyed liquid crystal groups of volumes, whether of multiple liquid crystal color layers or distributed volumes, or combination version of the liquid crystal color display, operation is, as follows: (a) both groups are off, i.e. in curvilinearly aligned phase such that the dye in both groups affects light serially incident thereon, the transmitted light will be filtered by both groups; (b) when one of the groups is on or in parallel aligned mode and the other is curvilinearly aligned, in the former the amount of filtering by dye therein will decrease, and preferably the volumes in such group become clear, and in the latter filtering still would continue; and (c) when both groups are on or aligned filtering further decreases and preferably all or nearly all incident light is transmitted.

To apply the prescribed input to the respective liquid crystal volumes or groups of volumes, plural electrodes, for example of optically transparent electrically conductive material, are employed. The electrodes are coupled to an electrical supply that may be manually, automatically, or otherwise controlled to determine whether or not an electric field is to be applied to a liquid crystal color layer or to a portion thereof, the voltage of such field and/or the frequency of the field or applied voltage. The electrical supply or drive may be one that includes multiplex circuitry to scan or to address various portions of a liquid crystal color layer or of multiple liquid crystal color layers and/or of distributed volumes layer(s).

Various electrode arrangements using dedicated electrodes for each liquid crystal color layer, shared electrodes, and/or combinations thereof may be employed.

For the distributed volumes embodiment, a two-electrode arrangement may be used with the liquid crystal itself or the volumes size providing a function to discriminate between different levels of energization, e.g. voltage or frequency level. For example, different liquid crystal materials may have different voltage threshold requirements; smaller size capsules require a larger voltage field to switch to aligned state relative to that voltage required to switch larger size capsules; and/or the liquid crystal could have a cross-over dielectric anisotropy changing from positive to negative (or vice versa) as a function of frequency of applied field or voltage.

Reference hereinafter to a liquid crystal display generally means a liquid crystal color layer together with the means (preferably electrodes, whether dedicated or shared) for applying a prescribed input (preferably an electric field) to all or portions of the liquid crystal color layer. The assemblage of such liquid crystal displays is referred to as a liquid crystal color display in accordance with the invention. According to a broad aspect of the invention it is possible that one of plural liquid crystal displays of a liquid crystal color display does not have pleochroic dye. Liquid crystal color display also means groups of such distributed volumes of differently dyed liquid crystal and means (preferably also electrodes) for applying a prescribed input to all or portions of the groups of volumes.

According to one aspect of the invention, a liquid crystal apparatus includes at least first and second liquid crystal displays positioned serially in a common optical path to affect incident light directed thereto, each of the displays including plural volumes of liquid crystal which in the absence of a prescribed input at least one of which scatters or absorbs light and which in the presence of such prescribed input reduces the amount of such scattering or absorption, at least some of the liquid crystal in at least one of the liquid crystal displays having pleochroic dye therein for coloring light passing therethrough.

According to another aspect of the invention, a dynamic light coloring device includes a first layer of liquid crystal material in plural volumes in a containment medium, a second layer of liquid crystal material in plural volumes in a containment medium, at least some of the liquid crystal material in at least one of the layers containing pleochroic dye, and an input device for selectively applying a prescribed input to one or more respective portions of respective layers to determine the coloring or not of light transmitted through such respective portion of a respective layer. Preferably each layer includes different colored pleochroic dye; the layers are arranged optically serially; and the liquid crystal color display is operative in an optically subtractive fashion to provide multicolor outputs.

According to a further aspect of the invention, a method of coloring light includes directing incident light onto a liquid crystal apparatus having plural layers of liquid crystal material in volumes in a containment medium and at least some of the liquid crystal having pleochroic dye therein, such layers being arranged in optical serial relationship with respect to the path of such incident light, and selectively applying a prescribed input to one or more respective portions of at least one of such layers to alter the optical characteristics thereof.

According to still another aspect of the invention, a dynamic color image may be created by directing light into a liquid crystal color display including plural layers of liquid crystal material in plural volumes in a containment medium, a plurality of the layers having different respective color characteristics, the layers being oriented in optical series relationship, and applying an electric input to one or more portions of the respective layers to affect the structure and optical characteristics of the liquid crystal material therein.

According to even another aspect a cross-linking of materials is employed to establish volume environments for the dyed liquid crystal with secure isolation to minimize the possibility of mixing of one dyed liquid crystal material with another dyed liquid crystal material.

According to even an additional aspect the liquid crystal material is capable of discriminating inputs thereto, for example as a function of the frequency or voltage of an applied field; for frequency discrimination a liquid crystal material having different characteristics as a function of frequency, e.g. a cross-over liquid crystal that has positive dielectric anisotropy below a given frequency and negative dielectric anisotropy above such given frequency, may be used; for voltage discrimination different size volumes of the same liquid crystal may be used, whereby smaller capsules require a larger applied voltage to switch than do larger capsules.

Yet an additional aspect relates to an optical device including an assemblage of plural groups of volumes of liquid crystal material, a plurality of the volumes formed of discrete capsules formed by containment medium of cross-linked polymer containing therein the liquid crystal material.

Yet a further aspect relates to a method of making liquid crystal capsules comprising the process of mixing a liquid crystal material with a cross-linking producing material to form a first mixture, mixing with the first mixture a polymer containment medium reactable with the cross-linking producing material of the first mixture to undergo cross-linking.

Yet still an additional aspect relates to an encapsulated operationally nematic liquid crystal including operationally nematic liquid crystal material in a volume defined by a cross-linked polymer.

Yet still a further aspect relates to an optical device including first and second pluralities of volumes of liquid crystal material in a containment medium, each of the first and second pluralities of volumes respectively having a different optical characteristic selectable in response to application and removal of a prescribed input, and each of the first and second pluralitites of volumes having a different input responsive characteristic to discriminate at least one parameter of such prescribed input to effect selection of such respective optical characteristics.

According to another aspect, a liquid crystal color display includes plural volumes of operationally nematic liquid crystal material in a containment medium and both pleochroic dye in the liquid crystal material and non-pleochroic dye in at least one of the liquid crystal and containment medium to provide a color output in response to a prescribed input.

According to an additional aspect, a liquid crystal optical device includes plural groups of volumes of liquid crystal in a containment medium, a plurality of such groups containing in the volumes thereof respective pleochroic dye to color light transmitted therethrough, the volumes being arranged relative to each other in generally optically serial relation to affect color of light transmitted therethrough in a subtractive color operation, and at least one of such groups containing in the volumes thereof black pleochroic dye operative selectively to attenuate light incident thereon.

According to a further aspect, a liquid crystal device includes a first plurality of volumes of a first liquid crystal material and a second plurality of volumes of a second liquid crystal material, the volumes being formed by a containment medium for tending to distort the natural structure of the liquid crystal material in the absence of a prescribed input, the second liquid crystal material having dielectric anisotropy that is frequency dependent, whereby the optical transmission characteristics of the device are a function of the magnitude and frequency of prescribed input applied to said liquid crystal materials.

According to still another aspect, an apparatus for signal discrimination includes plural volumes of liquid crystal material in a containment medium, the liquid crystal material having a positive dielectric anisotropy in one frequency domain and a negative dielectric anisotropy in a second frequency domain (or vice versa), the effect of which is to discriminate between applied electrical inputs, and an electrical input device for applying such electrical inputs to the liquid crystal material.

According to still a further aspect of the invention, a liquid crystal device includes plural volumes of liquid crystal material, the liquid crystal material having a natural structure which in the absence of a prescribed input is distorted by a surface defining said volumes, whereby in response to such distortion the volumes of liquid crystal material at least one of scatter or absorb light, and further including an input circuit for supplying as a prescribed input to the volumes of liquid crystal material first and second electrical signals, each having a relatively low and a relatively high frequency component that are respectively additive to apply a resultant field to such volumes of liquid crystal material. Moreover, preferably at least the liquid crystal material in some of such volumes is cross over liquid crystal material having two different dielectric anisotropy characteristics as a function of frequency of input electrical signal thereto.

According to at least one further aspect, a liquid crystal color display of the type herein described has pleochroic dye in at least one group or layer of volumes of liquid crystal material, such dye being operative to absorb ultraviolet light.

According to another aspect, a liquid crystal device uses a phase shifting driving system, with one or more frequencies to achieve particular optical output.

Another aspect is to provide a composite layer of two or more liquid crystal compositions that respond differently to a prescribed input.

Another aspect is to eliminate parallax in a liquid crystal optical serial device.

Another aspect is to maintain adequate resistivity of liquid crystal and a containment medium therefor to obtain adequate electric field across the liquid crystal in response to an applied voltage to affect alignment of the liquid crystal structure.

These and other objects, aspects, features, and embodiments of the invention will become more apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 20 is a schematic representation of a frequency discriminating liquid crystal device according to the invention;

FIG. 21 is a schematic representation of a multilayer liquid crystal device capable of multiplex and multifrequency/phase shifting driving operation;

FIG. 22 is a schematic representation of the plural crossed electrode strips arrangement in the multilayer liquid crystal device of FIG. 21 omitting the liquid crystal for clarity of illustration;

FIG. 23 is a graph of two frequency voltage signal waveforms;

FIGS. 24 and 25 are alternate embodiments of a multilayer liquid crystal device capable of multiplex and multi-frequency/phase shifting driving operation;

DESCRIPTION OF THE PREFERRED EMBODIMENT

Figure 1:
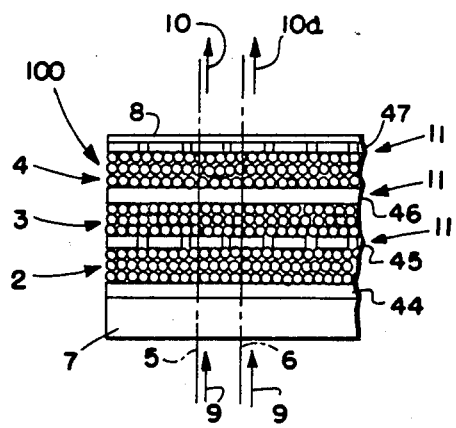
FIG. 1 is a fragmentary enlarged schematic view of a liquid crystal color display according to the invention.

Referring in detail to the drawings, wherein like reference numerals designate like parts in the several figures, and initially to FIG. 1, a liquid crystal color display according to the invention generally is shown at 1. The color display 1 includes three liquid crystal color layers 2, 3, 4 (although more or fewer than three may be used) arranged in optical serial relation relative, for example, to respective optical paths 5, 6 therethrough. The color layers are supported on a common support 7, such as Mylar film, or sheet material, on one side of the color display 1, and a protective material of plastic or other material 8 covers the other side of the color display 1. The color display 1 works in response to the selective application or not of a prescribed input to transmit or not with or without coloring the same incident light 9 to derive output light 10, 10a. To apply such prescribed input which preferably is an electric field, the color display 1 employs plural electrodes 11. Depending on the responsiveness of the liquid crystal thereto, the prescribed input may be other than an electric field, such as a magnetic field.

By selectively energizing or not respective electrodes 11, incident light 9, for example white light, may be transmitted as white, colored, or black (no transmission/full absorption) output light 10, 10a. Absent an electric field the liquid crystal in a given color layer is distorted or curvilinearly aligned, as is the pleochroic dye therein, and such layer then acts as a color filter according to the color of the dye therein. Therefore, when multiple layers are in the light absorbing/optical filtering state, such layers filter in a subtractive filtering sense the transmitted light. On the other hand, in the presence of an electric field a given liquid crystal color layer becomes partly or substantially optically transparent and non-filtering (or less filtering) as the liquid crystal structure and dye aligns or tends to align with respect to the field.

Figure 2:
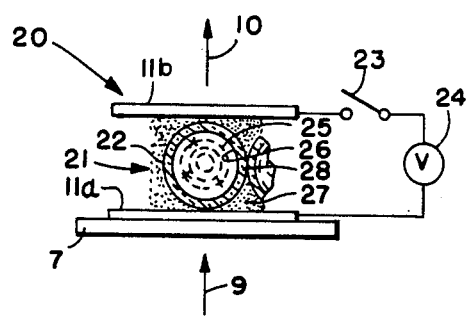
FIG. 2 is a schematic fragmentary representation of a liquid crystal display, which is a portion of the liquid crystal color display in accordance with the present invention.

Details of the invention are now described. Turning to FIG. 2, an example of a liquid crystal display used according to the invention is represented at 20. The display 20 may be considered the fundamental building block of which the liquid crystal color display described in greater detail below is formed. The display 20 may be generally of the type disclosed in the above-mentioned U.S. Pat. No. 4,435,047.

The schematically illustrated liquid crystal display 20 includes encapsulated liquid crystal material 21 represented by a single complete capsule 22 and part of another capsule in FIG. 2. Representative individual capsules also are in FIGS. 3, 4 and 5. Although the capsules illustrated in the drawings are shown in two dimensions and, therefore, planar form, it will be appreciated that the capsules are three dimensional, most preferably approximately spherical. Also, although the capsules 22 are shown in a single layer between electrodes 11a, 11b, there may be more than one layer of capsules of similarly dyed liquid crystal material in a containment medium between the electrodes and/or there may be plural layers of differently dyed encapsulated liquid crystal between the electrodes, as is described in greater detail below.

The capsule 22 (FIG. 2) is shown mounted on a preferably transparent support medium 7, such as Mylar film or sheet material. The liquid crystal display 10 also includes the pair of electrodes 11a, 11b for applying an electric field across the liquid crystal material when a switch 23, for example, is closed to energize the electrodes from a conventional voltage source represented at 24. The electrodes 11a, 11b preferably are optically transparent and may be formed of conventional materials, as is well known in the art. The electrode 11a, moreover, may be applied to the support 7, for example, a Mylar film support with an electrode material, such as indium tin oxide, coating one surface thereof. The electrode 11b may be applied by vacuum deposition, printing, or any other applicable technique that provides the desired optical and electrical characteristics. Exemplary electrode materials include indium tin oxide, tin oxide, and antimony doped tin oxide. The electrodes are relatively thin, for example, about 200 angstroms thick and are adequately transparent so that they preferably do not significantly affect the optics of the liquid crystal display 20.

The capsule 22 illustrated in FIG. 2, for example, may be one of many capsules that are discretely formed or, more preferably, that are formed by mixing the liquid crystal material with a so-called encapsulating material or containment medium to form an emulsion, preferably a stable one. The emulsion may be applied to the electrode covered support 7 after which the electrode 11b is applied. If desired, the support medium 7 and the encapsulating material or containment medium may be the same material, whereby the emulsion, upon curing, provides adequate self-support and containment of a plurality of volumes of liquid crystal material therein, thus forming the capsules 22.

The encapsulated liquid crystal material 21 includes liquid crystal 25 contained within the confines or interior volume 26 of a capsule 22. Each capsule 22 may be a discrete one or alternatively the liquid crystal 25 may be contained in a stable emulsion of a containment medium or so-called encapsulating material 27 that tends to form a multitude of capsule-like environments for containing the liquid crystal material. The capsules 22 may be fluidically isolated from each other or may be fluidically interconnected with one or more capsules. The encapsulated liquid crystal material 21, including a plurality of volumes 26 of liquid crystal material 25, may be formed of one or both of isolated discrete capsules/volumes and interconnected ones.

As the liquid crystal display 20 is one of the building blocks of the liquid crystal color display 1 according to the invention, pleochroic dye represented at 28 in the capsule 22 is included with the liquid crystal 25. The pleochroic dye 28 is represented by "X"-like markings in the capsule; only several such markings are shown in the various figures, but it will be appreciated that the same represent appropriate amounts of pleochroic dye to effect the desired coloring described in greater detail below. The pleochroic dye has a characteristic of aligning generally in parallel with the liquid crystal structure with which it is mixed. Accordingly, when the liquid crystal material is in the curvilinearly aligned phase, distorted from its natural generally linear structural alignment, the pleochroic dye 28 likewise will be in such distorted or curvilinearly aligned structural configuration; and when the liquid crystal structure is aligned with respect to an electric field, the pleochroic dye 28 will align in parallel with the liquid crystal material and, accordingly, with respect to the field. Therefore, in the description herein directed to various alignments or distortions of the liquid crystal structure, such description will be applicable similarly to the pleochroic dye 28.

Although the preferred shape of the capsule 22 is spherical, shapes other than spherical may be employed in the invention. The shape should provide the desired optical and electrical characteristics that will satisfactorily coact with the optical characteristics of the liquid crystal material 25, e.g. index of refraction, and will permit an adequate portion of the electric field to occur across the liquid crystal 25 itself for effecting desired ordered or parallel alignment of the liquid crystal when it is desired to have a field-on condition. The capsule shape also should tend to distort the liquid crystal structure when in a curvilinearly aligned phase or field-off or random alignment condition. A particular advantage to the preferred spherical configuration of the capsule 22 is the distortion it effects on the liquid crystal structure when in a field-off condition. This distortion is due, at least in part, to the relative sizes of the capsules and the pitch of the liquid crystal; they preferably are about the same or at least about the same order of magnitude. Moreover, nematic and operationally nematic liquid crystal material have fluid-like properties that facilitate the conformance or the distortion thereof with respect to the shape of the capsule wall, more particularly the wall surface, in the absence of an electric field. On the other hand, in the presence of an electric field, such nematic or operationally nematic material will relatively easily change to ordered alignment with respect to the field.

Liquid crystal material of a type other than nematic or combinations of various types of liquid crystal material and/or other additives may be used with or substituted for the preferred nematic or operationally nematic liquid crystal as long as the end result is an operationally nematic material. However, cholesteric and smectic liquid crystal materials generally are bulk driven, and because it is difficult to break up the bulk structure thereof for conformance to a capsule wall and to the energy considerations in the capsule, such materials are generally not preferred in the invention.

Operationally, the liquid crystal display 20 is intended when in the field-on condition to transmit incident light 9 therethrough without or substantially without affecting the light, and when in a field-off condition also to transmit the incident light 9 or at least to transmit a given color or colors of the incident light while filtering out or absorbing a given color and, therefore, not transmitting such absorbed color. Thus, the intensity and color characteristics of the transmitted light output 10 from the liquid crystal display 20 will be a function of the presence or absence of an electric field and the magnitude of any present electric field as well as of the other optical and electrical characteristics of the liquid crystal material, pleochroic dye, containment medium, and electrodes.

Preferably, according to the invention, to obtain deep colors, e.g. of good saturation and hue, it is desirable that the liquid crystal material itself have relatively low birefringence and that the index of refraction of the liquid crystal (both the ordinary and extraordinary indices of refraction) is matched or is substantially matched to the index of refraction of the containment medium. Therefore, the volumes of liquid crystal and pleochroic dye will function substantially exclusively as a controllable color filter and/or light transmitting device and not as a light scattering device.

Figure 3:
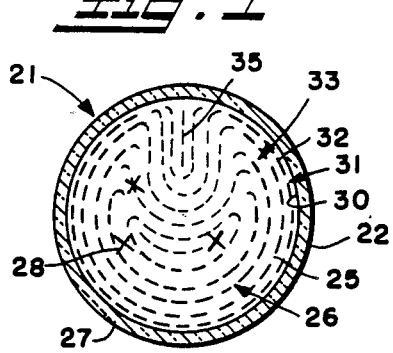
FIGS. 3 and 4 are enlarged schematic illustrations of liquid crystal capsules in accordance with the present invention respectively showing curvilinear alignment of the liquid crystal structure in parallel and normal relation to the capsule wall under a no-field or field-off condition.
Figure 4:
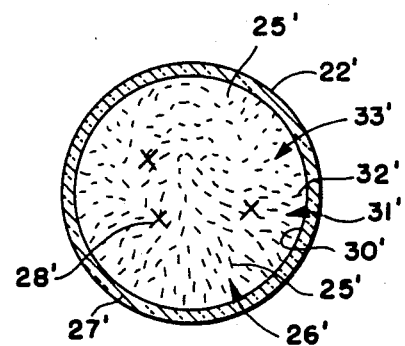
Figure 5:
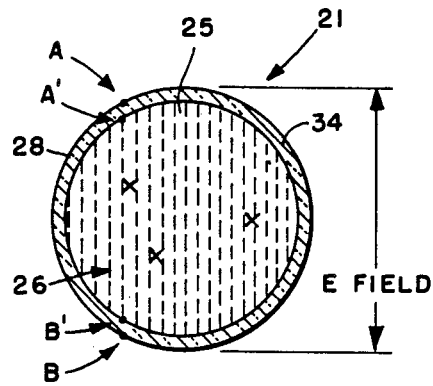
FIG. 5 is an enlarged schematic illustration of a liquid crystal capsule of the type shown in FIGS. 3 and 4 but with the capsule in the presence of an electric field and the liquid crystal structure aligned with respect to the field.

Turning to FIGS. 3, 4 and 5, a schematic representation of the single capsule 22 (22' in FIG. 4; primed reference numerals in FIG. 4 represent elements that are functionally and structurally generally the same as those identified by unprimed reference numerals in FIGS. 3 and 5) containing liquid crystal 25 is shown, respectively, in the field-off (FIGS. 3 and 4) and field-on (FIG. 5) conditions. The capsules 22 are spherical and have a generally smooth curved interior wall surface 30 defining the boundary for the volume 26. The actual dimensional parameters of the wall surface 30 and of the overall capsule 22 are related to the quantity of liquid crystal 25 contained therein and possibly to other characteristics of the individual liquid crystal material therein.

As a result of the foregoing, and due to the surface wetting nature of the liquid crystal, referring particularly to FIG. 3, the liquid crystal, more particularly the liquid crystal structure, which ordinarily in free form would tend to align in generally linear parallel relation, although perhaps randomly distributed, is distorted to curve in a direction that generally is parallel to a relatively proximate portion of the interior wall surface 30, i.e. the curvilinear aligned phase. Due to such distortion the liquid crystal material may store elastic energy. For simplicity of illustration, a layer 31 of liquid crystal molecules whose directional orientation is represented by respective dashed lines 32 is shown in closest proximity to the interior wall surface 30. The directional orientation of the liquid crystal molecules 32, more particularly the structure thereof, is distorted to curve in the direction that is parallel to a proximate area of the wall surface 30. The directional pattern of the liquid crystal molecules away from the boundary layer 32 within the capsule is represented by 33. The liquid crystal molecules are directionally represented in layers, but it will be appreciated that the molecules themselves are not confined to such layers. Thus, the organization in an individual capsule is predetermined by the organization of the structure 32 at the wall and is fixed unless acted on by outside forces, e.g. an electric field. On removal of the electric field the directional orientation would revert back to the original one, such as that shown in FIG. 3.

As is seen in FIG. 3, the liquid crystal 25 in the capsule 22 has a discontinuity 35 in the generally spherical orientation thereof due to the inability of the liquid crystal to align uniformly in a manner compatible with parallel alignment with the wall 30 and a requirement for minimum elastic energy. Such discontinuity is in three dimensions and is useful to effect a distorting of the liquid crystal 25 further to decrease the possibility that the liquid crystal 25 would be sensitive to optical polarization direction of incident light. The discontinuity protrusion 35 would tend to cause scattering and absorption within the capsule, and the tangential or parallel alignment of the liquid crystal molecules with respect to portions of the interior wall surface 30 of the capsules both cause scattering and and absorption within the capsule 22. When the electric field is applied, for example, as is shown in FIG. 5, the discontinuity will no longer exist so that such discontinuity will have a minimum effect on optical transmission when the encapsulated liquid crystal 21 is in a field-on or aligned condition.

Although the foregoing discussion has been in terms of a homogeneous orientation of the liquid crystal material (parallel to the capsule wall), such is not a requisite of the invention. All that is required is that the interaction between the wall and the liquid crystal produce an orientation in the liquid crystal near that wall that is generally uniform and piecewise continuous, so that the spatial average orientation of the liquid crystal material over the capsule volume is strongly curved and there is no substantial parallel direction of orientation of the liquid crystal structure in the absence of an electric field. It is this strongly curved orientation that results in the scattering, polarization insensitivity and, in particular, color filtering by the pleochroic dye, in the field-off condition, which is a feature of this invention.

Briefly referring to FIG. 4 in particular, there is shown an alternate embodiment of encapsulated liquid crystal material 21', which may be substituted in the various other embodiments of the invention disclosed herein. The encapsulated liquid crystal material 21' includes operationally nematic liquid crystal material 25' in the volume 26' of a capsule 22' having preferably a generally spherical wall 30'. In FIG. 4 the material 21' is in field-off condition, and in that condition the structure 33' of the liquid crystal is oriented to be normal or substantially normal to the wall 30' at the interface therewith. Thus, at the interface the structure 33' is generally oriented in a radial direction with respect to the geometry of the capsule 22'. Moving closer toward the center of the capsule 22', the orientation of the structure 33' of at least some of the liquid crystal will tend to curve in order to utilize, i.e. to fill, the volume of the capsule 22' with a substantially minimum free energy arrangement of the liquid crystal in the capsule, for example, as is seen in the drawing.

Such generally radial or normal (i.e. to the capsule wall 30') alignment of FIG. 4 is believed to occur due to the addition of an additive to the liquid crystal material 25' which reacts with the support medium to form normally oriented steryl or alkyl groups at the inner capsule wall. More particularly, such additive may be a chrome steryl complex or Werner complex that reacts with the support, containment or encapsulating medium that forms the capsule wall 30' to form a relatively rigid skin or wall with a steryl group or moiety tending to protrude radially into the liquid crystal material itself. Such protrusion tends to effect the noted radial or normal alignment of the liquid crystal structure. Moreover, such alignment of the liquid crystal material still complies with the above strongly curved distortion of the liquid crystal structure in field-off condition because the directional derivatives taken at right angles to the general molecular direction are non-zero.

Nematic type material usually assumes a parallel linear structural configuration and usually is optical polarization direction sensitive. However, since the material 32, 32' in the encapsulated liquid crystal 21, 21' is distorted or forced to curved form in the full three dimensions of the capsule 22, 22', such nematic liquid crystal material in such capsule takes on an improved characteristic of being insensitive to the direction of optical polarization of incident light. The inventor has discovered, moreover, that when the liquid crystal material 25 in the capsule 22 has pleochroic dye dissolved therein, such dye, which ordinarily also would be expected to have optical polarization sensitivity, no longer is polarization sensitive because the dye tends to follow the same kind of curvature orientation or distortion as that of the individual liquid crystal molecules 32.

In the field-on condition, or any other condition which results in the liquid crystal and pleochroic dye being in ordered or parallel alignment, as is shown in FIG. 5, the encapsulated liquid crystal 21 will transmit substantially all the light incident thereon and will tend not to be visible in the encapsulating medium 27, especially when viewed along the ordinary axis of the liquid crystal, i.e. generally in parallel with the field. On the other hand, in the field-off condition when the liquid crystal and pleochroic dye is in distorted alignement or curvilinearly aligned phase, sometimes referred to herein as random alignment, for example as is shown in FIGS. 3 or 4, some of the incident light will be absorbed by the dye to affect the color of the light output 10.

The index of refraction of the encapsulating medium 27 and the ordinary index of refraction of the liquid crystal 25 should be matched as much as possible when in the field-on or liquid crystal orderly aligned condition to avoid optical distortion due to refraction of incident light passing therethrough. However, when the liquid crystal material is in distorted or random alignment, i.e. there is no field applied, there will be a difference in the indices of refraction at the boundary of the liquid crystal 25 and wall of capsule 22; the extraordinary index of refraction of the liquid crystal usually being greater than the index of refraction of the encapsulating medium. Such occurrence of different indices of refraction is known as birefringence. Principles of birefringence are described in *Optics* by Sears (Addison Wesley, publishers) and in *Crystals And The Polarizing Microscope* by Hartshorne and Stewart, the relevant disclosures of which are hereby incorporated by reference. Preferably the encapsulating or containment medium 27 and the support medium 7 have the same index of refraction to appear optically substantially as the same material, thus avoiding a further optical interface.

Maximum contrast results when the ordinary index of refraction matches the index of refraction of the medium. The closeness of the index matching will be dependent on the desired degree of contrast and transparency in the device, but the ordinary index of refraction of the liquid crystal and the index of the medium will preferably differ by no more than 0.03, more preferably 0.01, especially 0.001. The tolerated difference will depend upon capsule size. Also, as was mentioned above, the liquid crystal preferably has low birefringence to obtain optimum colors and minimum scattering.

According to the preferred embodiment and best mode, desirably the electric field E shown in FIG. 5 is applied to the liquid crystal 25 in the capsule 22 for the most part rather than being dissipated or dropped substantially in the encapsulating material. There should not be a substantial voltage drop across or through the material of which the wall 34 of the capsule 22 is formed; rather, the voltage drop should occur across the liquid crystal 25 within the volume 26 of the capsule 22.

The electrical impedance of the encapsulating medium preferably should in effect be large enough relative to that of the liquid crystal in the encapsulated liquid crystal 21 that a short circuit will not occur exclusively through the wall 34, say from point A via only the wall to point B, bypassing the liquid crystal. Therefore, for example, the effective impedance to induced or displacement current flow through or via only the wall 34 from point A to point B should be greater than the impedance that would be encountered in a path from point A to point A' inside the interior wall surface 30, through the liquid crystal material 25 to point B' still within the volume 26, ultimately to point B again. This condition will assure that there will be a potential difference between point A and point B. Such potential difference should be large enough to produce an electric field across the liquid crystal material that will tend to align the same. It will be appreciated that due to geometrical considerations, namely the length through only the wall from point A to point B, for example, such condition still can be met even though the actual impedance of the wall material is lower than that of the liquid crystal material therein.

The dielectric constant of the material of which the encapsulating medium is formed and the dielectric coefficients of the material of which the liquid crystal is comprised, and the effective capacitance values of the capsule wall 34, particularly in a radial direction and of the liquid crystal across which the electric field E is imposed, all should be so related that the wall 34 of the capsule 22 does not substantially drop the magnitude of the applied electric field E. Ideally the capacitance dielectric constants (coefficients) of the entire layer of encapsulated liquid crystal material should be substantially the same for the field-on condition.

The liquid crystal 25 will have a dielectric constant value that is anisotropic. It is preferable that the dielectric constant of the wall 34 be no lower than the dielectric coefficient of the anisotropic liquid crystal material 25 to help meet the above conditions for optimum operation. It is desirable to have a relatively high positive dielectric anisotropy in order to reduce the voltage requirements for the electric field E. The differential between the dielectric constant (coefficient) for the liquid crystal 25 when no electric field is applied, which should be rather small, and the dielectric constant (coefficient) for the liquid crystal when it is aligned upon application of an electric field, which should be relatively large, should be as large as possible. The dielectric constants (coefficients) relationships are discussed in the above patents. It should be noted in particular, though, that the critical relationship of dielectric values and applied electric field should be such that the field applied across the liquid crystal material in the capsule(s) is adequate to cause alignment of the liquid crystal structure with respect to the field and is not short circuited through the encapsulating medium 27 to bypass the liquid crystal. The lower dielectric values of commonly used liquid crystals are, for example, from as low as about 3.5 to as high as about 8.

To achieve adequate performance of the invention, it is desirable that the resistivity of the layers of volumes of liquid crystal and containment medium be adequately high so that in response to an applied voltage across the layer, an electric field that will tend to affect, e.g. to cause alignement, the liquid crystal will be produced. Therefore, it is desirable to purify the containment medium, e.g. the polyvinyl alcohol, to avoid impurities that could reduce such resistivity. For example, to obtain adequate purity of PVA, the PVA could be purified by Soxlet extraction with methanol for thirty-six hours to remove ionic impurities-particularly those that would be soluble in the liquid crystal.

The capsules 22 may be of various sizes. The smaller the size, though, the higher the requirements will be for the electric field to effect alignment of the liquid crystal in the capsule. Preferably, though, the capsules should be of uniform size parameters so that the various characterisitics such as the optical and electrical characteristics, of an apparatus, such as a display, using the encapsulated liquid crystal will be substantially uniform. Moreover, the capsules 22 should be at least 1 micron in diameter so they appear as discrete capsules or volumes relative to an incident light beam; a smaller diameter would result in the light beam "seeing" the capsules as a continuous homogeneous layer and would not undergo the required isotropic scattering. Examples of capsule sizes, say from 1–30 microns diameter, and of liquid crystal material are in the above concurrently filed application and are hereby specifically incorporated by reference. Capsule or volumes sizes also may be in a broader range of from about 0.3 to about 100 microns, preferably 0.3 to 30 microns, especially 3 to 15 microns, and most preferably 5 to 15 microns.

A preferred liquid crystal material in accordance with the best mode of the invention is one like nematic material 1800 by E. Merck of West Germany. Another preferred liquid crystal is 2359 also by E. Merck. Other examples may be cholesteryl ester combinations, phenyl cyclohexanes, dicyclohexanes, biphenyl and/or biphenyl combinations, and the like.

Several other types of liquid crystal material useful according to the invention are disclosed in Table I (items 1–4) below and include the following four examples, each being a recipe for the respective liquid crystal materials. The so-called 10% material (item 1 in the table) has about 10% 4-cyano substituted materials; the 20% material has about 20% 4-cyano substituted materials, and so on. The 40% material and 40% MOD(ified) material both have 40% 4-cyano substituted materials.

TABLE I 1. 10% Material

| | |
|---|---|
| Pentylphenylmethoxy Benzoate | 54 grams |
| Pentylphenylpentyloxy Benzoate | 36 grams |
| Cyanophenylpentyl Benzoate | 2.6 grams |
| Cyanophenylheptyl Benzoate | 3.9 grams |
| Cyanophenylpentyloxy Benzoate | 1.2 grams |
| Cyanophenylheptyloxy Benzoate | 1.1 grams |
| Cyanophenyloctyloxy Benzoate | 9.94 grams |

TABLE I-continued

|   | | |
|---|---|---|
| Cyanophenylmethoxy Benzoate | 0.35 | grams |
| 2. 20% Material | | |
| Pentylphenylmethoxy Benzoate | 48 | grams |
| Pentylphenylpentyloxy Benzoate | 32 | grams |
| Cyanophenylpentyl Benzoate | 5.17 | grams |
| Cyanophenylheptyl Benzoate | 7.75 | grams |
| Cyanophenylpentyloxy Benzoate | 2.35 | grams |
| Cyanophenylheptyloxy Benzoate | 2.12 | grams |
| Cyanophenyloctyloxy Benzoate | 1.88 | grams |
| Cyanophenylmethoxy Benzoate | 0.705 | grams |
| 3. 40% Material | | |
| Pentylphenylmethoxy Benzoate | 36 | grams |
| Pentylphenylpentyloxy Benzoate | 24 | grams |
| Cyanophenylpentyl Benzoate | 10.35 | grams |
| Cyanophenylheptyl Benzoate | 15.52 | grams |
| Cyanophenylpentyloxy Benzoate | 4.7 | grams |
| Cyanophenylheptyloxy Benzoate | 4.23 | grams |
| Cyanophenyloctyloxy Benzoate | 3.76 | grams |
| Cyanophenylmethoxy Benzoate | 1.41 | grams |
| 4 40% MOD | | |
| Pentylphenylmethoxy Benzoate | 36 | grams |
| Pentylphenylpentyloxy Benzoate | 24 | grams |
| Cyanophenylpentyl Benzoate | 16 | grams |
| Cyanophenylheptyl Benzoate | 24 | grams |

The encapsulating medium forming respective capsules 32 should be of a type that is substantially completely unaffected by and does not affect the liquid crystal material. Various resins and/or polymers may be used as the encapsulating medium. A preferred encapsulating medium is polyvinyl alcohol (PVA), which has a good, relatively high, dielectric constant and an index of refraction that is relatively closely matched to that of the preferred liquid crystal material. An example of preferred PVA is an about 84% hydrolized resin, molecular weight of at least about 1,000. Use of a PVA of Monsanto Company identified as Gelvatol 20/30 represents the best mode of the invention. Latex is another preferred encapsulating medium.

A method for making emulsified or encapsulated liquid crystals 11 may include mixing together the containment or encapsulating medium (e.g. water soluble PVA), the liquid crystal material, and perhaps a carrier medium, such as water. Mixing may occur in a variety of mixer devices, such as a blender, a colloid mill, which is most preferred, or the like. What occurs during such mixing is the formation of an emulsion of the ingredients, which subsequently can be dried eliminating the carrier medium, such as water, and satisfactorily curing the encapsulating medium, such as the PVA. Although the capsule 22 of each thusly made encapsulated liquid crystal 21 may not be a perfect sphere, each capsule will be substantially spherical in configuration because a sphere is the lowest free energy state of the individual droplets, globules or capsules of the emulsion, both when originally formed and after drying and/or curing.

An example of an acid type containment medium useful in the invention is Carbopol (carboxy polymethylene polymer by B. F. Goodrich Chemical Company), or polyacid.

In accordance with the invention, several different polymer containment media that may be used are listed in Table II below. Table II also indicates several characteristics of the respective polymers.

TABLE II

| Containment Medium | Viscosity | % Hydrolyzed | Molecular Weight | Temperature & % Solutions |
|---|---|---|---|---|
| 20/30 | 4–6 CPS | 88.7–85.5 | 10,000 | 4% at 20° C. |
| Gelvatol, by Monsanto Company 40/20 | 2.4–3 CPS | 77–72.9 | 3,000 | 4% at 20° C. |
| Gelvatol, by Monsanto Company 523, by Air Products And Chemicals, Inc. | 21–25 | 87–89 | — | 4% at 20° C. |
| 72/60 | 55–60 | 99–100 | — | 4% at 20° C. |
| Elvanol, by DuPont Co. 405 | 2–4 CPS | 80–82 | — | 4% at 20° C. |
| Poval, by Kurashiki | | | | |

Other Gelvatol PVA materials that may be used include those designated by Monsanto as 20–90; 9000; 20–60; 6000; 3000; and 40–10.

A preferred quantity ratio of liquid crystal material to containment medium is about one part by weight liquid crystal material to about three parts by weight of containment medium. Acceptable encapsulated liquid crystal emulsion operative according to the invention also may be achieved using a quantity ratio of about one part liquid crystal material to about two parts containment medium, e.g., Gelvatol PVA. Moreover, although a 1:1 ratio also will work, generally it will not function quite as well as material in the ratio range of from about 1:2 to about 1:3.

Various techniques may be employed to form the support medium 7, which may be of the same or similar material as the encapsulating or containment medium. For example, the support medium 7 may be formed using a molding or casting process. The electrode 11a and liquid crystal material may be applied for support by that medium 7. The electrode 11b may be applied, e.g. by printing. Thereafter, an upper support medium or protective cover portion 8 (FIG. 1) may be poured or cast in place to complete enclosing the encapsulated liquid crystal material and the electrodes if desired. Alternatively, the support medium portion 7 may be a substantially transparent plastic-like film, e.g. Mylar, or a plate of glass.

In accordance with the invention, other types of support media 7 that may be used include polyester materials; and polycarbonate material, such as Kodel film. Tedlar film, which is very inert, also may be used if adequate adhesion of the electrode can be accomplished. Such media 7 preferably should be substantially optically transparent.

In a sense the support medium may be considered as that which supports the liquid crystal material. Accordingly, the support medium may be broadly construed as including or being formed by the containment medium; in such sense the support medium may also be construed as possibly, but not necessarily, including an additional material, e.g. Mylar material 7. In the illustrated preferred embodiment and best mode, though, there is a liquid crystal material, a containment medium which contains the liquid crystal material and provides the surface to effect the desired structure distortion, and a support on which the liquid crystal material and containment medium are supported.

A liquid crystal color display is generally indicated at 1 in FIGS. 1 and 6–8. As shown, the display 1 includes three liquid crystal color layers 2, 3, 4, and four electrode layers 44–47 (generally 11 in FIG. 1). Each liquid crystal color layer is sandwiched between a pair of electrode layers. The color layers 2, 3, 4 are arranged in a so-called optical serial relation such that incident light represented by the arrow 9 traveling along an optical path or a light path can travel through all three layers and emerge from the display 1 as transmitted light represented by arrow 10. However, if desired, the display 1 may include more or fewer than the illustrated three color layers 2, 3, 4 arranged in such optical serial relation. Moreover, in an alternate embodiment the liquid crystal color layers may be staggered and one or more of them may be less than fully coextensive over the full input plane 50 of the liquid crystal color display 1, whereby in any given optical path through the display 1, for example the optical path represented by the arrows 9 and 10, only two, in any event less than all, of the liquid crystal color layers would appear in such path.

Figure 6:
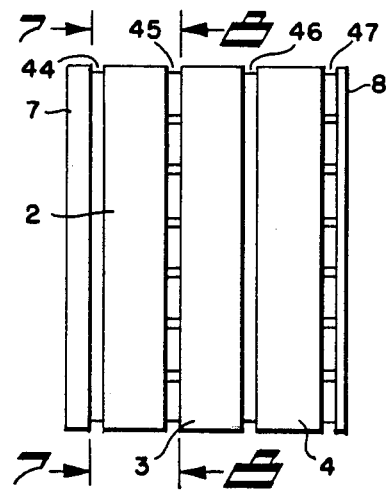
FIG. 6 is a side elevation or section view of a multilayer liquid crystal color display in accordance with the preferred embodiment and best mode of the invention.
Figures 7, 8, 9:
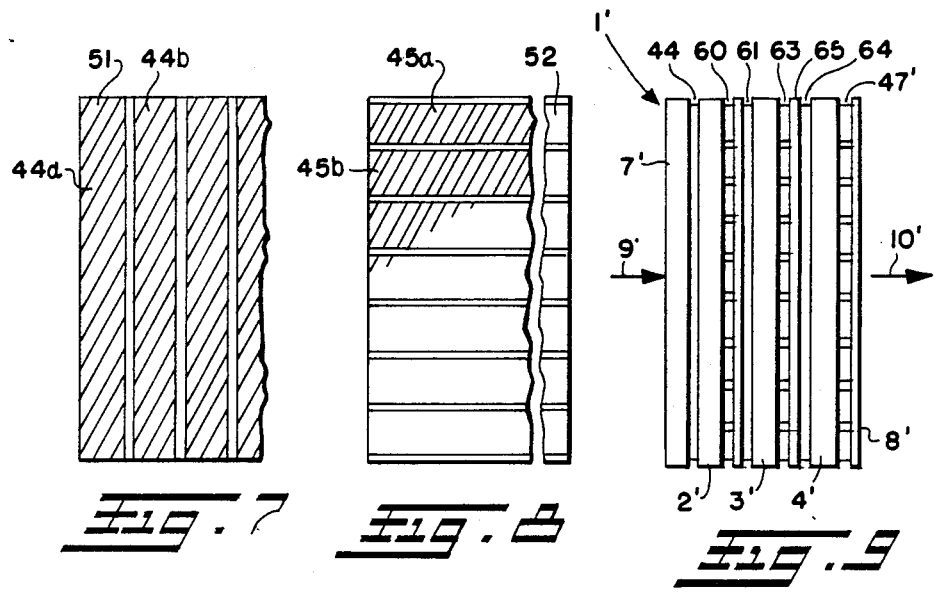
FIGS. 7 and 8 are, respectively, lefthand and righthand plan views of the liquid crystal color display of FIG. 6 looking generally in the direction of the arrows 7—7 and 8—8 of FIG. 6.
FIG. 9 is a fragmentary enlarged schematic view of an alternate embodiment of liquid crystal color display in accordance with the invention.

Each of the electrode layers 44, 45, 46 and 47 shown in FIG. 6 is energizable, preferably on a selective basis, to apply an electrical input, preferably an electric field, across a portion of a respective liquid crystal color layer sandwiched therebetween. Each electrode layer, such as the layer 44 shown in plan elevation view in FIG. 7, includes a plurality of electrode strips, such as those designated 44a, 44b, etc. (Electrode, electrode layer, and electrode strip may be used interchangeably herein, for example depending on context.) To facilitate the selective application of an electric field to different respective portions of each of the liquid crystal color layers, the electrodes in relatively adjacent layers are orthogonally related or are otherwise oriented in non-parallel (not 0° or 180°) relation. Accordingly, as is seen in FIG. 7, the electrode layer 44 is formed of a plurality of vertical electrode strips 44a, 44b; the electrode layer 45, on the other hand, is formed of a plurality of horizontal electrode strips 45a, 45b, etc., as is illustrated in FIG. 8. Likewise, the electrode layer 46 is formed of vertical strips like those shown in FIG. 7, and the electrode layer 47 is formed of horizontal electrode strips like those shown in FIG. 8. The arrangement of electrode strips in the electrode layers permits selective application or not of an electric field to respective portions of the liquid crystal color layer between a pair of electrodes. Thus, for example, if the electrode strips 44a, 45a had applied thereto appropriate electrical energization, the same would be effective to apply an electric field across a section of the liquid crystal color layer 2 that is essentially aligned and essentially directly between the electrode strips 44a, 45a, the approximate size of the section of liquid crystal color layer 2 being so energized being represented, for example, by the dashed line-bounded rectangle 51 in the upper left corner of the illustration in FIG. 7 and by a portion 52 shown in the upper right hand quadrant of the illustration in FIG. 8. It will be appreciated that by appropriately energizing respective pairs of electrodes in adjacent layers, various portions of a liquid crystal color layer sandwiched therebetween can have an electric field selectively applied thereto. If desired, one or both of the electrode layers on opposite sides of a liquid crystal color layer may be formed of a solid electrode, electrode strips or portions arranged in a pattern other than those illustrated in FIGS. 6–8, etc., depending on the desired use and operation of the liquid crystal color display 1.

Turning briefly back to FIG. 1, the liquid crystal color layers 2, 3, 4 and the electrode layers 44–47 are illustrated in greater detail. The display 1, including such layers, is mounted on a support 7, such as a Mylar, Plexiglass, glass, or other preferably optically transparent material, and a protective layer of preferably optically transparent material 8, such as Mylar sheet, is provided above the electrode layer 47. As is seen in FIG. 1, each of the liquid crystal color layers 2, 3, 4 is formed of encapsulated liquid crystal material 21 arranged such that a plurality of capsule-like volumes 26 in capsules 22 are provided in each layer. The capsules 22 in the given liquid crystal color layer, such as that shown at 2, may be arranged in an orderly stacked layer arrangement, may be close-packed, may be randomly distributed; etc. The thickness of a given layer should be adequate to enable the encapsulated liquid crystal material 21 therein when in a field-off condition to affect light incident thereon and transmitted therethrough and should be adequately thin to permit substantial optical transparency when in a field-on condition.

To achieve the desired color response of the display 1, pleochroic dye is contained in the respective encapsulated liquid crystal material 21 in each of the layers 2, 3, 4. In one example of the invention, the layers 2, 3, 4 may, respectively, contain yellow, cyan, and magenta color pleochroic dye. Other dyes may be used, as well. However, it is preferred that each liquid crystal color layer contain only a single color dye or a single color mixture of dyes. In an alternative arrangement, different portions of respective liquid crystal color layers may contain different respective dyes or mixtures thereof.

In a liquid crystal color display 1 illustrated in FIG. 1 (and similarly shown in FIG. 6) in which the liquid crystal color layer 2 contains yellow pleochroic dye; the liquid crystal color layer 3 contains cyan color pleochroic dye; and the liquid crystal color layer 4 contains magenta color pleochroic dye; by selectively applying or not an electric field to respective portions of respective liquid crystal color layers, a multicolor output of the transmitted light 10 selectively can be achieved. When the encapsulated liquid crystal material 21 in the yellow dyed liquid crystal color layer 2 is in the field-on condition, such layer becomes substantially optically transparent and will have minimum affect on the light incident thereon and, accordingly, transmitted therethrough. However, when the liquid crystal material 21 in the color layer 2 is in the field-off condition, the light transmitted therethrough will be colored, dyed, or filtered in such a way that it tends to appear yellow. Accordingly, with the liquid crystal material in the color layers 3 and 4 in a field-on condition so that the same is effectively optically transparent, and the liquid crystal material in the yellow color layer 2 in the field-off condition, for white incident light 9, the output light 26 will be yellow in color. It will be appreciated that the pleochroic dyes in the color layers 2, 3, 4 function to absorb specific color or colors of light when in the field-off condition. Accordingly, operation of the liquid crystal color display 1 may be analogized to the operation of negative film used in color photography; and the construction and operation of the display 1 may be similar to the construction and operation of such negative film employed in color photography.

Table III below depicts several possible combinations of field-on and field-off conditions of respective portions of the liquid crystal color layers 2, 3, 4 and as a function of the particular combination of field-on/field-off conditions and white incident light 9, the color of the output light 10.

TABLE III

|         | Green | Magenta | Red | White | Black | Blue |
|---------|-------|---------|-----|-------|-------|------|
| Yellow  | Off   | On      | Off | On    | Off   | On   |
| Cyan    | Off   | On      | On  | On    | Off   | Off  |
| Magenta | On    | Off     | Off | On    | Off   | Off  |

An example of yellow pleochroic dye would be Sudan-I; of cyan would be Indophenol Blue; and of magenta would be D-37. Other pleochroic dyes also would function according to the invention; an example would be red pleochroic dye Sudan-III.

Along the vertical axis shown at the left hand side of Table III, the color of the respective liquid crystal layers 2, 3, 4, is represented. Along the horizontal axis at the top of Table III is represented the color of the output light 10 as a function of white input light 9 and the field-off or field-on state of the liquid crystal in a given layer 2, 3, 4 in a serial optical path, such as that represented at 5 or 6, directly through the display 1. Accordingly, to obtain a green color output light 10, the yellow dyed liquid crystal material 21 in a layer 2 proximate the path 5 should be in the field-off condition; that in the layer 3 proximate the path 5 should be in the field-off condition; and that in the layer 4 proximate the path 5 should be in the field-on condition. It will be appreciated that those colors, as well as others, shown in Table III, as well as white and black, can be achieved by selectively applying or not an electric field to respective portions of liquid crystal color layers 2, 3, 4.

By selectively energizing, i.e. applying an electric potential across, respective electrodes in the display 1, it is possible to obtain output light 10 along optical path 5 of one color and output light 10a along another optical path 6 of a different color simultaneously. The electrodes in electrode layers 45 and 46 of the display 1 are located between the liquid crystal color layers on opposite sides thereof and are of the singular shared type cooperating with each other and respectively with non-shared or dedicated electrodes in the electrode layers 44 and 47 to apply, when necessary, an electric field across respective portions of respective liquid crystal color layers to achieve the desired optical output of the display 1. Electrical circuitry for energizing the respective electrodes is not shown in detail; however, it will be appreciated that such circuitry may include an electrical power supply, switching circuitry, and electrical connections to respective electrodes selectively to energize the same to apply an electric field or not to the liquid crystal material between a respective pair of electrodes, as was mentioned earlier. An advantage to the shared electrode configuration of the display 1 in FIG. 1 is the minimizing of the number of electrodes and, therefore, the minimizing of any optical attenuation (absorption) effected by the electrode(s) on light incident thereon. Although the electrodes are substantially optically transparent, it is the usual case that the electrode layer will not be 100% transmissive.

Referring to FIG. 9, a modified liquid crystal color display 1' which uses a separate pair of non-shared or dedicated electrode layers for each liquid crystal color layer is illustrated. The display 1' is similar to the display 1 described above with reference to FIG. 1, and, therefore, primed reference numerals designate parts in the display 1' corresponding to similarly identified parts in the display 1.

The display 1' includes a support 7', liquid crystal color layers 2', 3', 4', and a protective layer 8'. Additionally, the liquid crystal color display 1' includes an electrode layer 44' between the support 7' and color layer 2' and an electrode layer 47' between the color layer 3' and the protective sheet 8'. However, in contrast to the liquid crystal color display 1, the color display 1' does not require the sharing of electrodes. Therefore, between the liquid crystal color layers 2', 3', there are two electrode layers 60, 61 separated by an electrically insulating or non-conductive material 62, all of which are optically transparent or at least substantially optically transparent; and between the liquid crystal color layers 3', 4', are electrode layers 63, 64 and an optically transparent insulator 65. The electrode layers 60, 63 have horizontal electrode strips, as is shown in end view in FIG. 9, similar to the electrode strip arrangement illustrated in FIG. 8; and the electrode layers 61, 64 have vertical electrode strips shown in end view in FIG. 9 arranged in a way similar to the electrode strips illustrated in FIG. 7. It will be appreciated that other electrode patterns, arrangements and configurations may be employed consistent with the invention to effect application selectively of electric field to certain portions of respective liquid crystal color layers in the display 1'.

In operation of the liquid crystal color display 1', respective electrodes in layers 44', 60 may be selectively energized or not to effect application or not of an electric field at respective portions of the liquid crystal color layer 2'. Likewise, respective electrode strips in the electrode layers 61, 63 may be selectively energized or not to apply or not electric field to respective portions of the liquid crystal color layer 3', and the same is true with respect to the electrodes in the electrode layers 47', 64 with respect to the liquid crystal color layer 4'. Thus, it will be appreciated that in the liquid crystal color display 1', each liquid crystal color layer 2', 3', 4', has a dedicated respective pair of electrode layers for affecting the encapsulated liquid crystal material in the color layer. Operation of the liquid crystal color display 1' in FIG. 9 is similar to the operation of the liquid crystal color display 1 described above with reference to FIG. 1. However, the light traveling through the display 1' from the incident light 9' to the output light 10' will have to pass through several additional electrode layers and insulation layers relative to the fewer number of layers required in the display 1 of FIG. 1. Operation of the liquid crystal color display 1', though, will follow the responses depicted in Table III above, and it will be appreciated that the output light 10' from different respective portions of the display 1' may be colored differently, depending on the energization or not of respective electrodes and the parallel aligned field-on condition or curvilinearly aligned, distorted condition of the encapsulated liquid crystal material through which light must travel to be emitted as output light 10'.

Examples 1-3 describe the making of three differently dyed encapsulated liquid crystal materials. Each such material may be used, for example, in a respective liquid crystal color layer of a liquid crystal color display as is illustrated and described herein.

EXAMPLE 1

This is an example of making pleochroic dyed encapsulated liquid crystal, which absorbs blue light and transmits green and red light.
1. Materials a. 400 grams of Air Products 205, 14% high viscosity polyvinyl alcohol (PVA), b. 100 grams of Merck 1800 nematic liquid crystal material, c. 0.03 gram of M-361 Mitsui Totsu yellow pleochroic dye-(absorbs blue light and allows green and red light to go through).

2. Method

The polymer was weighed out in a beaker. The liquid crystal was weighed out, was placed on a hot plate, and was heated slowly. The dye was weighed out on a balance and was added very slowly to the liquid crystal, being stirred until all the dye went into solution. The liquid crystal and dye solution then was filtered through a standard Millipore filtering system using 8 ml. filter paper. The filtered liquid crystal and dye solution was stirred into the polymer using a Teflon rod. The mixture was encapsulated by placing the same in a colloid mill that was operated at medium shear for five minutes. The emulsion produced was pulled as a film on a conductive polyester sheet.

3. Operation

In operation of such material, in the absence of an applied electric field, the emulsion appeared yellow. Upon application of a 10 volt electric field, the liquid crystal structure began to align and the deepness of yellow color, i.e. color saturation, began to diminish; and at 40 volts the liquid crystal reached operational saturation and maximum optical transmissivity (minimal color filtering) occurred.

EXAMPLE 2

This is an example of making pleochroic dyed encapsulated liquid crystal which absorbs red light and transmits green and blue light.

Carry out the steps of Example 1 using the materials of Example 1 except substitute 0.5 gram of indophenol blue, (a cyan dye-red absorber and green and blue transmitter), the latter ingredient being a pleochroic dye, for the yellow dye of Example 1. Operation was the same as in Example 1 except for the color of filtered light.

EXAMPLE 3

This is an example of making pleochroic dyed encapsulated liquid crystal, which absorbs green light and transmits blue and red light.

1. Materials a. 4 grams of 20% medium viscosity partly hydrolysed PVA, such as Air Products 405 PVA.

b. 2 grams of 1800 Merck nematic liquid crystal material.

c. 0.08 gram of D-37 magenta pleochroic dye (a proprietary pleochroic dye of E. Merck of West Germany, which absorbs green light and transmits blue and red light).

2. Method

The polymer was weighed out in a beaker. The liquid crystal was weighed out, was placed on a hot plate, and was heated slowly. The dye was weighed out on a balance and was added very slowly to the liquid crystal, being stirred until all the dye went into solution. The liquid crystal and dye solution then was filtered through a standard Millipore filtering system using 8 ml. filter paper. The filtered liquid crystal and dye solution was stirred into the polymer using a Teflon rod. The mixture was encapsulated by placing the same in a colloid mill that was operated at medium shear for five minutes. A slide was taken using a Teflon rod, and upon inspection showed medium size capsules of about 3 to 4 microns in diameter. The material was filtered through a Millipore screen filter, and another slide was taken; on inspection there was very little change in capsule size from the first-mentioned inspection. The emulsion produced was pulled as a film on a conductive polyester sheet using a doctor blade set at a 5 mil gap.

3. Operation

In operation of such material, upon application of a 10 volt electric field, the liquid crystal structure began to align, and at about 40 to 60 volts the liquid crystal reached full on or saturation and maximum optical transmissivity. Color response was generally as in Example 1 except for the color.

A multicolor device can be made using any two or more of the dyed encapsulated liquid crystal materials mentioned above in Examples 1-3 according to the invention to achieve different respective color combinations, as may be desired. Also, any two liquid crystal materials, each having a different turn on voltage or frequency may be used according to the invention, each being preferably dyed with a different respective pleochroic dye. The multicolor device may be either voltage responsive, frequency responsive, or both, and may, if desired, use separate pairs of electrodes or shared electrodes, or both.

EXAMPLE 4

This is an example of operation of a multicolor liquid crystal display, according to the invention, having two liquid crystal color layers for example respectively formed according to Examples 1-3.

Red dye (either Sudan-III or Sudan-IV) was used in one layer of encapsulated liquid crystal material of a multicolor optical display device of the invention, and indophenol blue was in the other layer of encapsulated liquid crystal. The dyes, as preferably is the case in the several examples included in this disclosure, were pleochroic. In operation, when both layers were off, the device or area thereof which was off, was black; with the red off and blue on, the device or area was red; with the blue on and red off, the device or area was blue; and with both layers on, the device or area was generally clear or transparent. (Note that "off" means the liquid crystal is in distorted or curvilinearly aligned phase and the dye therein is absorbing; "on" means the liquid crystal is aligned with the applied field and it and the dye therein are substantially optically transparent with no or minimal color absorption or filtering.)

This example, and it will be apparent from the disclosure herein that a number of the embodiments of the invention, would be operational regardless of what method or technique disclosed herein is employed to turn on the respective liquid crystal layers together or independently. For example, either separate electrodes for each layer may be used; a shared electrode arrangement may be used whereby the electrode between the two layers is shared; and/or the voltage and/or frequency discrimination procedures described herein may be used for the purpose.

Figure 10:
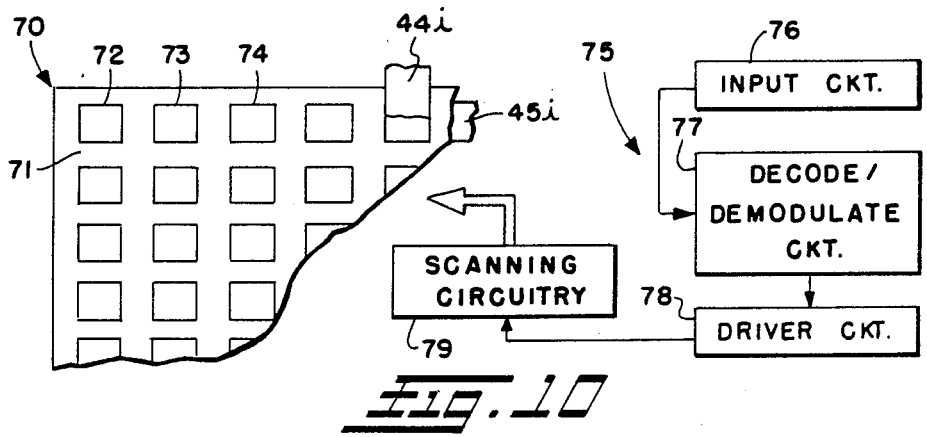
FIG. 10 is a schematic view of a flat panel multi-color display system, for example useful in a television type display, according to the present invention.

In FIG. 10 is illustrated a front view of a liquid crystal color display 70 which may be of the type designated 1 in FIG. 1 or designated 1' in FIG. 9. The size selected for the display 70, i.e. the cross-sectional area of the viewing side or surface thereof, may be substantially unlimited. Exemplary sizes may be from smaller than one square inch of area for the viewable or observable surface 71, i.e. the surface ordinarily viewed by an observer, to several square inches, to television size (from small screen size to large screen size), to billboard size, etc. Accordingly, exemplary uses of the liquid crystal color display 70 would be small and large size displays, television, motion picture-type displays, billboard displays, and so on. As is seen in FIG. 10, there are illustrated a number of pixel-like areas, such as those designated 72, 73, 74, which represent respective portions of liquid crystal color layers in the display 70 where respective crossed electrodes, such as electrodes 44*i*, 45*i* (FIG. 10) or electrodes 44*a*, 45*a* (FIGS. 7 and 8) cross each other on opposite sides of at least one liquid crystal color layer; see, for example, the description above concerning the portion of liquid crystal color layer 2 located between portions 51, 52 or electrode strips 44*a*, 45*a* (FIGS. 6-8). Behind each pixel-like area viewable at the observable surface 71 of the liquid crystal color display 70 are the respective optically aligned portions of several respective liquid crystal color layers, such as the layers 2, 3, 4 of FIG. 6 or 2', 3', 4' of FIG. 9.

Associated with the liquid crystal color display 70 in FIG. 10 is electrical circuitry 75, the purpose of which is to energize (or not) respective electrodes of the display 70 selectively to apply (or not) an electric field to a particular portion, e.g. that behind one of the pixel-like areas 72, 73, 74, of respective liquid crystal color layers thereby to create a desired image, whether fixed or moving, appearing at the observable surface 71. In FIG. 10 two exemplary electrode strips 44*i*, 45*i* are illustrated. It will be appreciated that the circuit 75 may be coupled to all of the electrodes, such as the multiple electrodes shown in FIGS. 1 and 6-9, employed in the liquid crystal color display 70 to effect production of a fixed or moving image by applying and maintaining or varying the application of electric field at various portions of the overall liquid crystal color display 70 to achieve at each of the pixel-like portions 72, 73, 74, etc., a light output of a color determined according to the above-described principles and, for example, the combinations set forth in Table III above. The pixel-like areas may be relatively large or small, depending upon the desired resolution required for the liquid crystal color display 70, and depending on whether or not merging of colors is desired in an additive fashion at the observable surface 71.

The exemplary circuit 75 includes an input circuit 76 for receiving an input signal, such as a video signal, for example having luminence and chromaticity information; in this example the display 70 may be employed as a color television screen, monitor, etc. The circuitry 75 similarly could be employed with the display 70 for producing a color optical output of a physical size larger than conventional television screen or even large screen television size. The input circuit 76 is coupled to a decode or demodulate circuit 77, which separates the chromaticity and luminence information and delivers appropriately responsive output signals to driver circuit 78. The driver circuit 78 may amplify and/or synchronize the information received from the circuit 77 and then couples the same to drive a scanning circuit 79. It is the scanning circuit 79, then, that preferably repetitively addresses or scans the individual pixel-like portions of respective liquid crystal color layers located behind the pixel-like areas 72, 73, 74, etc. selectively to apply (or not) an electric field across a given pixel-like portion of a particular liquid crystal color layer, e.g. the portion of the liquid crystal color layer 2 (FIG. 6) bounded or aligned with the portions 51, 52 of the electrode strips shown in FIGS. 7 and 8, and to control the magnitude of any applied electric field. Such scanning or addressing may be similar to the type of scanning or addressing encountered in conventional color television picture systems.

For the purpose of background information, the individual circuits 76-79 may be of the type and/or may operate according to the type disclosed, for example, in U.S. Pat. Nos. 3,627,924; 3,636,244; and 3,639,685; the disclosures of which hereby are incorporated in their entireties by reference. In particular, the latter two patents directly relate to color television signal decoding and utilization in a color television system, and the first-mentioned patent discloses a system for scanning electroluminescent points in an overall electroluminescent array. Such scanning may be employed in accordance with the present invention, and such signal usage and coding may be employed, too, according to the present invention to achieve the desired multicolored display output from the liquid crystal color display 70.

The liquid crystal color display 70 as driven by the circuitry 75 may operate in a truly subtractive mode in which it is intended that only the color produced by a given pixel 72, 73, 74, etc. will have an optical influence on the observer —the pixel size would be relatively large in this case e.g. so as not to produce substantial color addition when viewed relatively close up. The subtractive color definition is, of course, a function of the optical filtering effected as input light 9 (FIG. 1) is transmitted through the various layers of the display 70 and ultimately is emitted as output light 10. Alternatively, the size of the individual pixels 72, 73, 74, etc. of the display 70 may be relatively small so that additive color operation, such as that disclosed in copending U.S. patent application Ser. No. 480,461 now U.S. Pat. No. 4,662,720, mentioned above is effected. This latter may be considered a subtractive/additive optical mode. For example, if the pixels are rather small, e.g. like color dots of a color television, the colors produced at respective proximate pixels are added or, in a sense, integrated, by the eye of an observer. The colors of individual pixels are produced by subtractive optical technique of the multiple dyes in respective volumes of liquid crystal making up the respective pixel.

It will be appreciated that the display 70 may be illuminated by ambient illumination from the non-viewing side or by an additional light source provided at the non-viewing side.

The liquid crystal color displays 1, 1' and 70, as well as the other displays disclosed herein, may be employed for a variety of purposes including, for example, to effect color display of data, characters, information, picures, etc. simply to control light, on both small and large scale. Exemplary pleochroic dyes and combinations thereof to effect particular color outputs are mentioned above, for example in connection with Table III, but it will be appreciated that other dyes and color filtering combinations, including fewer or more than three dyes described in detail above in the preferred embodiment, may be employed according to the invention. The invention may be used to display over a long period of time a single image or picture or may be employed to produce a moving picture type of output. The output itself may be viewed directly, photographed, projected, etc.

Figures 11, 12:
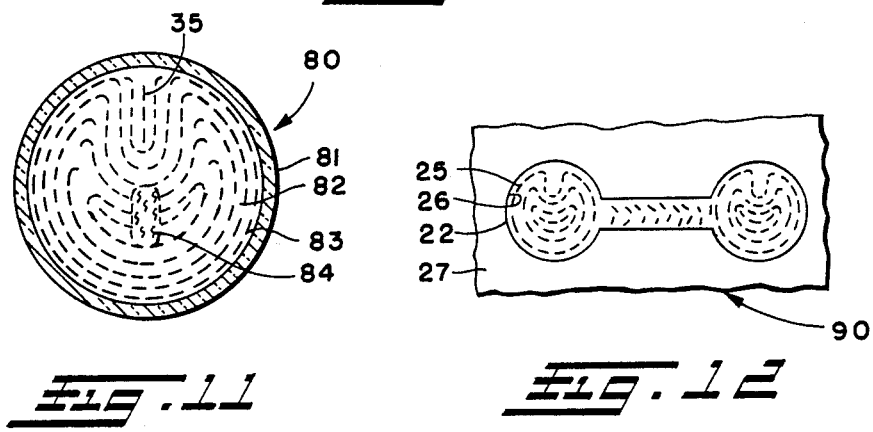
FIG. 11 is a schematic illustration of a nematic liquid crystal capsule with cholesteric material additive, which may be used with the several embodiments herein.
FIG. 12 is a schematic view of a pair of interconnected capsule volumes useful in the invention.

As is seen in FIG. 11, an additive may be used in the liquid crystal to expedite return to distorted alignment. In FIG. 11, an encapsulated liquid crystal 80 is shown including a capsule wall 81 having operationally nematic liquid crystal material 82 in the interior volume 83 thereof. An exemplary additive, namely a cholesteric chiral additive 84, is in solution with the liquid crystal material 82, although the additive is shown for facility of illustration at a central location in the capsule volume 83 because the function thereof primarily is with respect to the liquid crystal material remote from the capsule wall. The encapsulated liquid crystal 80 is shown in field-off, distorted, curvilinearly aligned condition, mode or phase with the liquid crystal material distorted in the manner described above. The liquid crystal material most proximate the wall of the capsule tends to be distorted to a shape curved like the inner boundary of that wall (or generally normal thereto). The chiral additive 84 tends to expedite return of the operationally nematic liquid crystal material more proximate the central portion of the capsule to the curvilinearly aligned phase upon the removal of an electric field.

The encapsulated liquid crystal material employed in the several embodiments of the invention may include fluidically interconnected volumes or capsules illustrated at 90 in FIG. 12. The curvilinearly aligned phase of the liquid crystal material contained in such volumes may be oriented generally parallel to the capsule walls or normal with respect thereto (radial with respect to the center of the capsule).

In FIG. 12 only two interconnected volumes are shown, but it will be appreciated that individual volumes may be connected to one or more other such volume(s). The encapsulated liquid crystal material 80 (FIG. 11) and/or 90 (FIG. 12) may be employed in the various embodiments of the invention described in detail above.

As was mentioned above, an advantage of sharing electrodes, e.g. in the display 1 of FIG. 1, is the minimizing of optical absorption by the electrodes. The use of a single pair of electrodes to apply electric field to two differently dyed liquid crystal color layers, e.g. layers 2, 3 of FIG. 1 would further reduce the electrode requirements for a multicolor display. In such case, though, a discrimination function is needed to determine which layer(s) is (are) to turn on in response to a particular prescribed input, e.g. electric field.

Figure 13:
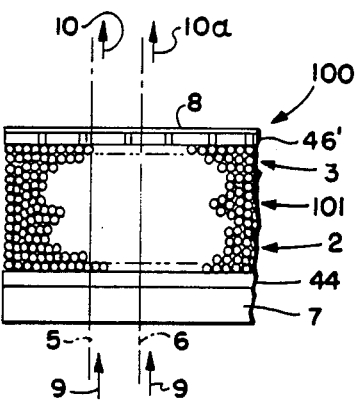
FIG. 13 is a fragmentary enlarged schematic view of a liquid crystal color display using two different color layers and a single pair of shared electrodes.

Turning now to FIG. 13, such a multilayer, multicolor shared (two) electrode liquid crystal display 100 according to an embodiment of the invention is illustrated. The display 100 is generally similar to the display 1 (FIG. 1) and may include various one or more of the several features of the invention described herein. Uniquely, though, the display 100 includes a pair of liquid crystal layers 2, 3 that contain different pleochroic dye, e.g. magenta in layer 2 and cyan in layer 3; that are not separated by an electrode; and that share a single pair of electrodes (or electrode strips) 44, 46'. (Electrode 46' is analogous to electrode 46 in FIG. 1, but is shown generally crossed or perpendicular to the direction of electrode 44 for the same reason that various electrodes are shown and described above in crossed relation i.e. to define pixel-like areas of liquid crystal between respective electrodes and to which electric field selectively can be applied.) The layers 2, 3 meet at an interface 101 and are arranged in optical serial relation to the optical paths 5, 6 so as to affect incident light 9. (Although only two layers 2, 3 are shown sharing a pair of electrodes 44, 46' in FIG. 13, more than two differently dyed layers may be used.) Each of the electrodes 44, 46' may be plural strips of electrodes, as is described above, to produce a static or dynamic multicolor output by selective energization of respective electrode strips.

The layers 2, 3 may be formed as in the above Examples and may be pulled separately on the support medium 7. For example, the layer 2 may be pulled first directly on the electrode layer 44 and support 7. After the layer 2 has adequately cured, the layer 3 may be pulled on top of layer 2, and then the electrode layer 46' may be applied. Other techniques also may be used to form the display 100.

The layers 2, 3 are in intimate but non-mixing relation. Such layers function in optical serial relation. However, due to the intimate engagement and the coextensive extent of the layers 2, 3 (and possibly also due to thinness thereof), parallax is avoided. Rather, on being viewed, the two layers 2, 3 appear as one layer. Moreover, using a thin dividing electrode, e.g. as the electrode 45 in FIG. 1, parallax also is eliminated or substantially eliminated in the optical serial device of the invention.

In the display 100 the layers 2, 3 preferably have at least one different electrical characteristic, e.g. frequency response, voltage threshold requirement to align with respect to an applied field, etc., to discriminate the prescribed input thereto, as is described in further detail below. For example, the liquid crystal, and thus the pleochroic dye, in layer 2 may respond, e.g. align, with respect to an electric field applied at one threshold voltage level, say 10 volts; and the layer 3 may be similarly responsive only when the voltage exceeds a second threshold of, say, 20 volts. Therefore, in response to an electric field applied by electrodes 44, 46' below the lower threshold or in the absence of such field, incident light 9 (e.g. white light) would be filtered by both layers 2, 3; above the first threshold but below the second threshold, primarily only the layer 3 would effect filtering-the layer 2 then being aligned with the field and preferably substantially transparent; and above the second threshold, both layers would be aligned and neither layer 2 nor layer 3 would effect filtering.

The display 100 is capable of producing multicolor output using only the two terminals, i.e. connections of the electrodes 44, 46' or respective strips thereof to a single power source, thus simplifying the display. An important advantage of the display 100 eliminating the need for an electrode between the layers 2, 3 is the eliminating of the optical absorption of such electrode; therefore, a corresponding brightening of the output from the display is achieved.

Discriminating the electric field input to both layers 2, 3 as a function of the difference in voltage response of the liquid crystal layers 2, 3 in the display 100 can be achieved by using different liquid crystal materials that have different respective dielectric anisotropy characteristics in the respective layers 2, 3. Thus, for example, the 10% material (item 1 in Table I above) has one dielectric anisotropy characteristic making the same responsive to a relatively high voltage; and the 40% material (item 3 in Table I) has a different dielectric anisotropy characteristic, making the same responsive to a lower voltage. Therefore, the layer 2 may be comprised of the 40% material containing, say, magenta dye, and the layer 3 may be comprised of the 10% material containing, say, cyan dye. Accordingly, below the first threshold, the light output 10 or 10a would be blue if the incident light 9 were white (see Table III above); above the first but below the second threshold, the light output would be cyan; and above the second the output would be white-this assuming absence or transparency of layer 4 in the display 100.

Another example of such use of display 100 would be to include Sudan-III or Sudan-IV dye, each of which is red, in the 10% cyano liquid crystal material (item 1 in Table I) and indophenol blue dye, which is a cyan dye, in the 40% cyano-liquid crystal material (item 3 in Table I). Since the red and cyan dyes are complementary, the light output is black when the liquid crystal in the layers 2 and 3 is in field-off curvilinearly aligned condition or mode. Above the first threshold voltage, the 40% material turns on and the light output from the display becomes red due to filtering by the Sudan-III or Sudan-IV dye. Above the second threshold no filtering occurs and the light output from the display is white, i.e. the display is clear.

Preferably the layers 2, 3 in display 100 are electrically matched so that the voltage applied thereto between the electrodes 44, 46' is divided substantially equally for simplicity of various operational considerations. However, as is described further below, since the dielectric constants and dielectric anisotropy of the different liquid crystal materials in the different layers 2, 3 are different, it may be necessary to make one layer thicker than the other to achieve the desired electrical characteristics, e.g. generally equal voltage drop across the layers.

Figure 14:
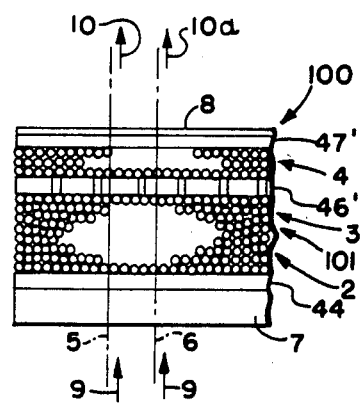
FIG. 14 is a fragmentary enlarged schematic view of a liquid crystal color display similar to that of FIG. 13, but using three different color layers and a pair of shared electrodes and an additional electrode.

As is shown in FIG. 14, a modified display 100' like the display 100 has an additional liquid crystal color layer 4. The layer 4 can perform selected further filtering of light by the contained/encapsulated liquid crystal therein; preferably the layer 4 includes a pleochroic dye different in color from the dye in the layers 2, 3. Electrodes 47' (like the electrode(s) 47 but preferably crossed relative to electrode strips in electrode 46') cooperate with electrodes 46' to apply electric field to the liquid crystal in layer 4, as above. Color output would follow Table III above, for example.

The display 100' may be made in the same way as the display 100, but with the layer 4 added above the electrode layer 46' followed by the application of the electrode layer 47'. Other techniques also may be used to make the display 100'.

It is noted that the various displays herein may include more than two or three color layers of liquid crystal material.

ISOLATING CAPSULES

Applicant has discovered that capsule-like environments for the dyed liquid crystal material can be formed in such a way as to maintain substantial isolation of the liquid crystal in one capsule from the liquid crystal in another capsule or otherwise in contact with the exterior of the first-mentioned capsule. Such isolating capsules defining volumes of contained liquid crystal may be used in the several embodiments of the invention.

In particular, such capsules can be formed, for example, by a condensation reaction, more preferably by a polycondensation reaction, and most preferably by a reaction that yields a cross-linking or cross-linking type result. In a preferred embodiment such capsules are formed from a solution of the liquid crystal material and a cross-linkable polymeric material, on the one hand, and another cross-linkable polymeric material on the other hand; the two polymeric materials are reactable to effect a cross-linking of the polymer, especially at the surface, to form a capsule which is water-insoluble and water-impermeable. When the liquid crystal material and first cross-linkable polymer material are not intersoluble, a solvent such as chloroform can be utilized. Such resulting cross-linked polymer containment medium has substantial isolating characteristics so as to maintain the dyed liquid crystal therein substantially isolated from that in other capsules.

Advantages of such isolation are apparent from the further description below. However, it will be realized that such isolation improves longevity of a liquid crystal display employing such materials; such material also avoids deterioration due to external environments, water, humidity, dirt, chemicals, etc.

In the preferred embodiment of the invention, such cross-linking is achieved by mixing a maleic anhydride derived copolymer, for example one known as poly(methyl vinyl ether/maleic anhydride) made and/or sold by GAF Corporation under the identification Gantrez 169, with the dyed liquid crystal material. The dyed material may be one of the type described in the several recipes in Table I above or the 8250 material also described above. A solvent, such as chloroform, also may be added to facilitate the dissolving of the maleic anhydride polymer in the liquid crystal material itself. The solution just mentioned is mixed with polyvinyl alcohol, and a cross-linking reaction occurs to form a water insoluble polymer.

Figure 15:
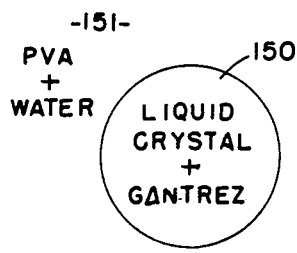
FIG. 15 is a schematic view of a capsule undergoing formation.

FIG. 15 shows the formation of a capsule using liquid crystal and Gantrez 169 in the center 150; and PVA and water 151 about the outside. The cross-linking reaction occurs at the boundary of the liquid crystal and Gantrez mixture 150 to form a capsule. The result is the formation of an insoluble film or wall confining the liquid crystal material and dye within the capsule. The film is insoluble in both the liquid crystal and in the water.

If the cross-linking or other formation of capsules encounters introduction of ionic impurities in the liquid crystal and containment medium system, it would no longer be possible (or at least it would be more difficult) to develop adequate voltage across the liquid crystal to get adequate electric field to obtain alignment of liquid crystal structure in response thereto. Therefore, the invention uses techniquies in forming such capsules that do not reduce resistivity of the liquid crystal or containment medium. One such technique is the Soxlet extraction purification method mentioned above.

It is due to the observation of the film and to the observing of water insolubility of the capsules that actual cross-linking is believed to occur when the two mentioned polymer materials react. For these reasons the capsule walls are referred to as being formed of cross-linked material. However, it is important to note that whether or not classical cross-linking occurs, the result of the invention yields a isolating, substantially water insoluble capsule.

Thus, fundamentally the isolating capsules are formed by a pair of reactants, one of which is water soluble and the other of which is soluble in the liquid crystal material, and those reactants together undergo a polycondensation reaction.

EXAMPLE 5

This example demonstrates the use of cross-linking with dyed liquid crystal material.

A poly(methyl vinyl ether/maleic anhydride), namely 2% Gantrez 169, available from GAF and which is a low molecular weight polyvinylmethoxymaleic anhydride, was dissolved in a 40% cyano liquid crystal material, which is an ester defined in Table I above. 20% chloroform also was added in the mixture as a solvent. To such solution a 22% solution of 20/30 polyvinyl alcohol (the remainder being water), was then mixed. The resulting mixture was allowed to sit for about one hour, and the result was a suspension of liquid crystal in capsules in which the wall was formed by the product of the cross-linking reaction between the maleic anhydride moiety and the PVA.

It is important that the liquid crystal, Gantrez (or other cross-linkable polymer) and chloroform be intersoluble. Various ester liquid crystal materials may be used, such as those identified in Table I and the 8250 material mentioned above. Also other materials may be used as long as the cross-linking is achieved to provide strength, durability and insolubility of the capsules.

The foregoing chemical cross-linking technique can be used with some of the dyes, such as D-54 and indophenol blue, which are compatible with the several materials used. An object of the cross-linking technique is to isolate the liquid crystal in a isolating capsule environment resulting in a product that has a long shelf life and operational life. Importantly, the foregoing technique can be used to produce two or more different groups of capsules, respectively containing different liquid crystal materials, one liquid crystal material containing one dye and the same or another liquid crystal material containing a different dye, etc. The groups of capsules can be mixed together without destroying the integrity of the individual capsules; thus, the individual liquid crystal materials and dyes, if used, remain isolated from each other although individual capsules of respective liquid crystal material themselves are mixed.

The materials and procedures of Examples 1-4 may be practiced using the cross-linking or polycondensation reaction technique of Example 5 as long as the desired cross-linking or polycondensation reaction occurs. Exemplary cross-linking producing materials or condensation agents may be an aldehyde, a dialdehyde, a polycarboxylic acid or a polycarboxylic anhydride; and more specifically may be at least one of the group gluteral aldehyde, dioxal glycoxal acetaldehyde, formaldehyde, phthalic anhydride, maleic anhydride, poly(-methyl vinyl ether/maleic anhydride), and polyvinyl-methoxymaleic anhydride. Further condensation agents would be diisocyanates, such as toluene diisocyanate, hexolmetholene diisocyanate, and others that will undergo polycondensation reaction with alcohols, for example.

The water soluble polymer part of the ingredients to form the isolating capsules may be, for example, the mentioned polyvinyl alcohol, or any polyhedric alcohol. Examples would be ethylene glycol and water, propylene glycol and water, or glycerine and water.

It will be appreciated that other techniques may be employed to achieve the cross-linked or otherwise isolating and relatively insoluble volumes of liquid crystal for use in the invention. Other materials also may be used for the liquid crystal material, dye, containment medium, cross-linkable polymer, e.g. maleic anhydride containing copolymer, etc. to achieve the desired cross-linked, isolating, relatively insoluble capsules or in any event volumes containing the liquid crystal material, whether or not dyed. Also, the polyvinyl alcohol can be replaced by other polymers which can cross link the cross-linkable polymer in the solution.

Figure 16:
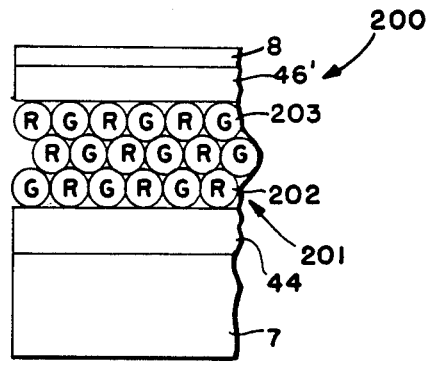
FIG. 16 is a fragmentary enlarged schematic view of a liquid crystal color display using a homogeneous distribution of differently dyed liquid crystal color capsules.

In FIG. 16 is shown an example of a multicolor display device 200 employing such a mixture 201 of a group or plurality of red-dyed liquid crystal capsules 202 and a group or plurality of green-dyed liquid crystal capsules 203 is shown. The capsules 202, 203 are the isolating capsules of cross-linked materials described above, and, therefore, such capsules provide adequate isolation of one dyed liquid crystal material from the other. Since the capsules 202, 203 are mixed and only one pair of electrodes 44, 46' (or electrode strips) is used, a means to discriminate the electric field input, e.g. according to magnitude, ordinarily would be provided. Thus, using liquid crystal materials that have different operational voltage characteristics as was described with respect to the display 100 of FIG. 13, the liquid crystal material in one or both of the groups of capsules 202, 203 can be aligned or not and a multicolor output can be achieved. For white input light, the actual color of the output light would depend on which, if any, of the liquid crystal capsules 202, 203 is in field-on parallel aligned (with the electric field) condition and which, if any, is in curvilinear aligned condition.

Some materials, such as some pleochroic dyes, contain alcohol groups and will react with the Gantrez. Therefore, using such materials, the described cross-linking would not occur and the so-called isolating, water insoluble capsules of cross-linked polyester material would not be obtainable. In such case, it may be necessary to maintain suitable isolation between respective dyed liquid crystal materials, e.g. by maintaining separate layers of the same. For example, one layer of volumes of dyed liquid crystal material in an emulsion of PVA or other containment medium could be pulled on a support; after such emulsion has cured or otherwise stabilized, a second layer of a differently dyed liquid crystal material in a containment medium could be pulled on top of the first-mentioned one; and so on. Alternatively, one or more electrode layers, transparent film layers, etc., could be located between the dyed liquid crystal layers.

Figure 17:
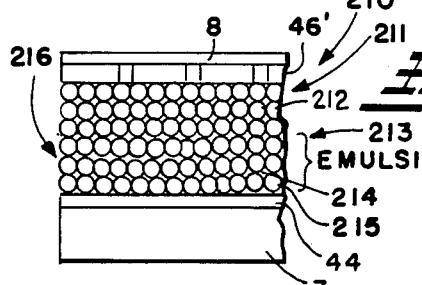
FIG. 17 is a fragmentary enlarged schematic view of a liquid crystal color display using true encapsulated dyed liquid crystal and other dyed liquid crystal material in an emulsion matrix.

Alternatively, if it is not possible to use the isolating cross-linked capsules, say due to reaction with the dye employed in one layer, but it is possible to use such isolating capsules for the other layer of a multicolor display device, then such a display using both an emulsion of liquid crystal and dye in a containment medium, e.g. PVA, and the isolating capsules according to the invention may be formed. Such a display 210 is illustrated in FIG. 17 using one layer 211 of actual cross-linked or isolating capsules 212 of dyed liquid crystal and a separate layer 213 of PVA 214/dyed liquid crystal 215 which form an emulsion 216. (Each layer may include more than one layers of capsules or volumes of dyed liquid crystal material, as is seen in FIG. 17.) The walls of the capsules 212 effect the needed isolation to prevent the two different respective liquid crystal and dye mixtures from mixing with each other. It also may be possible to mix the capsules 212 in with the emulsion 216 to form a generally homogeneous layer of capsules containing one liquid crystal material and dye therein and further volumes of the other liquid crystal material and dye essentially contained in the overally containment medium, e.g. PVA.

For discriminating between different magnitude or voltage levels of electric field simultaneously applied to differently dyed liquid crystal materials in separate volumes, e.g. in the displays 100, 100', 200, 210 described above, the use of two liquid crystal materials that have different respective field-on alignment threshold voltage levels may be used. One example of such voltage threshold discrimination capability is mentioned above in relation to FIGS. 13 and 14, namely, the proposed use of the 10% and 40% cyano liquid crystal materials identified in Table I above. Each of such liquid crystal materials has a different voltage threshold which is required before the liquid crystal will turn on to parallel alignment with respect to the applied field overcoming the force of the capsule or volume containing the liquid crystal material and tending to force the same to the curvilinearly aligned or distorted structure. (Such difference in threshold voltage may be a function of capsule or volume size, as was mentioned above and is described further below.)

The use of at least one cross-over liquid crystal material is another way to effect discrimination as a function of frequency and voltage of electric field applied by a single pair of electrodes.

CROSS-OVER LIQUID CRYSTAL MATERIAL

A cross-over liquid crystal material is one that has a characteristic that changes as a function of input. For example, in the preferred embodiment, the liquid crystal material may have two different dielectric anisotropies-one dielectric anisotropy, e.g. negative, at one frequency (say at a low frequency) of applied electric field and a second different dielectric anisotropy, e.g. positive, at a different frequency (say at a high frequency). Therefore, at different frequencies of electric field one can obtain different respective operation of the liquid crystal, such as selective switching from the same liquid crystal material. Exemplary cross-over liquid crystal materials that are operationally nematic are, as follows:

TABLE 4

By E. Merck:
ZLI-2461, by E. Merck;
ZLI-2978, by E. Merck;
TX-2A;
KOD-M, by Kodak (a mixture of 50 % p-octylphenyl 2-chloro-4-(p-pentylbenzoate + 50% p-pentyl (phenyl 2-chloro-4-(ppentyl benzoyloxy) benzoate);
3333, by Roche;
3421, by Roche.

According to one embodiment of the invention illustrated in FIG. 20, a liquid crystal device 200', similar to the display 200 described above, is able to discriminate the frequency and voltage or amplitude of an input electrical signal. Such liquid crystal device 200' includes plural volumes 204 of frequency responsive liquid crystal material 205. Preferably the liquid crystal material is contained in a containment medium 206 as is described herein. An example of such liquid crystal material is the cross over 2461 liquid crystal material mentioned above. Examples of containment media also are described herein. Preferably, although not necessarily, the liquid crystal material includes pleochroic dye 28 mixed therewith to operate in a guest-host relation, as is described herein.

Such liquid crystal device 200' is capable of discriminating between input electrical signals according to voltage and frequency. For example, when no electric field is applied to the device 200', the liquid crystal generally is in the distorted alignment configuration shown in FIGS. 3 or 4, described above, which causes light scattering or causes corresponding pleochroic dye 28 structure to absorb a given color light. In response to application of an electric field by the electrodes 46', 44, such that the field frequency is relatively low and the voltage amplitude is above the threshold level of the liquid crystal material to cause the liquid crystal structure to align generally in parallel with such field, such generally parallel alignment will occur, e.g. as is shown in FIG. 5, and the amount of scattering or absorption will decrease. Furthermore, upon increasing the frequency of the input electrical signal to a frequency above the cross over threshold level of the liquid crystal material 205, the apparent polarity of dielectric anisotropy of the liquid crystal material changes to the opposite polarity, e.g. from positive to negative. Therefore, the liquid crystal structure will change from alignment in parallel with the electric field to non-alignment or to alignment in a generally perpendicular direction with respect to the electric field, which may also be referred to hereinafter as non-alignment, as the operative optical effect will be the same. More specifically, if the extraordinary index of refraction of the liquid crystal material is different from the index of refraction of the medium in which it is contained, light scattering will occur; and/or if pleochroic dye is contained in the liquid crystal, increased absorption will occur.

Several properties of ZL1-2461 nematic type liquid crystal material include the following: Dielectric anisotropy, delta E (E is dielectric coefficient because E may change as a function of direction with respect to the alignment of the liquid crystal, i.e. structure orientation of the liquid crystal, frequency, etc.), at low frequency, e.g. below about 3 KHz at room ambient temperature, is +3. In particular, $E_{parallel}$ is 7.8, and $E_{perpendicular}$ is 4.8 (parallel and perpendicular refer to ordinary and extraordinary directional considerations relative to alignment of the axis of the liquid crystal structure). Switch over frequency is 3 KHz at room ambient temperature. Switch over frequency is that frequency of the applied electric field at which the dielectric anisotropy of the cross-over liquid crystal material changes from positive to negative and vice-versa. Dielectric anisotropy at the relatively higher frequency of 10 KHz is −1.5. Optical anisotropy is relatively low, namely, delta N=0.13. (N is the index of refraction, and delta N is the difference between the ordinary index of refraction and the extraordinary index of refraction of the liquid crystal material.) Therefore, such 2461 material has relatively low birefringence. The 2461 liquid crystal is compatible with several other liquid crystal materials. Such compatibility is manifest in the following operative example.

The 2461 liquid crystal material matches well with the 10% cyano liquid crystal material mentioned above. Both the 2461 and the 10% cyano materials turn on (turn on means the liquid crystal structure aligns with respect to the applied field and preferably reduces scattering and/or absorption and increases optical transmission) at the same time and in response to the same magnitude electric field at low frequency. However, at high frequency (say, 10 KHz.), only the 10% cyano liquid crystal material would turn on at such magnitude of electric field; since the 2461 material would have a negative dielectric anisotropy at high frequency it would not turn on. The cross-over material may be used in the several embodiments of the invention disclosed herein. For example, if such 2461 material were used in the red capsules 202 in the display 200 of FIG. 16 and 10% cyano liquid crystal were used in the green dyed capsules 203, operation would be, as follows:

a. No field applied-liquid crystal in both capsules 202, 203 would be distorted and red and green filtering would occur.

b. Field applied at relatively low frequency at a magnitude above the threshold voltage for both capsules 202, 203— the liquid crystal and dye in both capsules would align and incident light would be transmitted without any or substantially without any filtering.

c. Field applied at relatively high frequency at a magnitude above the voltage for both, particularly for the 10% cyano material —the 2461 liquid crystal has negative dielectric anisotropy, will not align with respect to the field, and accordingly will cause the dye therein to filter light; while the 10% cyano material remains in parallel alignment to the field so the dye therein will not effect or will only minimally effect filtering.

d. A further possibility is that the field is applied at low frequency and adequate threshold voltage to turn on the 2461 material but the voltage is inadequate to turn on the 10% cyano material-in this case only the dye in the 10% cyano liquid crystal containing volumes would effect filtering, and the 2461 liquid crystal and dye would have no or minimal filtering effect. (If the 10% cyano material and the 2461 material have the same threshold voltages at low frequency, then it may be necessary to substitute for the former a different liquid crystal having a higher threshold voltage than the 2461 material or to change the size of the volumes of one of the liquid crystal materials to alter the voltage response, or even to change the thickness of respective liquid crystal color layers (if separate color layers are used) to have different threshold voltages.)

Combination/compatibility of cross-over liquid crystal with other liquid crystal materials: It is not critical which of the above recipes (Table I, for example) of liquid crystal materials is used with the cross-over material. For assuring turn on at the same time at low frequency, one must use liquid crystal material that has a dielectric anisotropy which is about the same as the low frequency dielectric anisotropy as that of the 2461 liquid crystal material. For example, 10% cyano and 2461 liquid crystal materials may be used. Another example would be 2461 material and 2116-110 liquid crystal material, also by Merck. All the delta N's (optical anisotropy-N is index of refraction) and delta E's match for these except that the 2461 turns off at high frequency or does not switch at high frequency because at high frequency the 2461 liquid crystal material has negative dielectric anisotropy.

It also is contemplated to use two or more different liquid crystal materials that have different cross-over frequencies. Therefore, it would be possible to obtain discrimination at more than one frequency. Using one of such liquid crystal materials in one group of volumes and another in another group, the liquid crystal materials preferably would not mix. Examples of such liquid crystal materials useful according to this arrangement are 3421 by Roche that has a low cross-over frequency of about 400 Hz. and 3333 liquid crystal by Roche that has a relatively higher cross over frequency of 3.2 KHz.

CAPSULE SIZE CONSIDERATIONS

Capsule size can play an important role in accomplishing voltage discrimination function for the several layers of encapsulated liquid crystal material. The smaller the capsule, for a given liquid crystal material, the larger the voltage required to switch the liquid crystal material to aligned state. Accordingly, the same liquid crystal material can be used in each of the liquid crystal layers, but each layer is formed of capsules of different respective size. In this way voltage discrimination can be accomplished with the same liquid crystal.

Figures 18, 19:
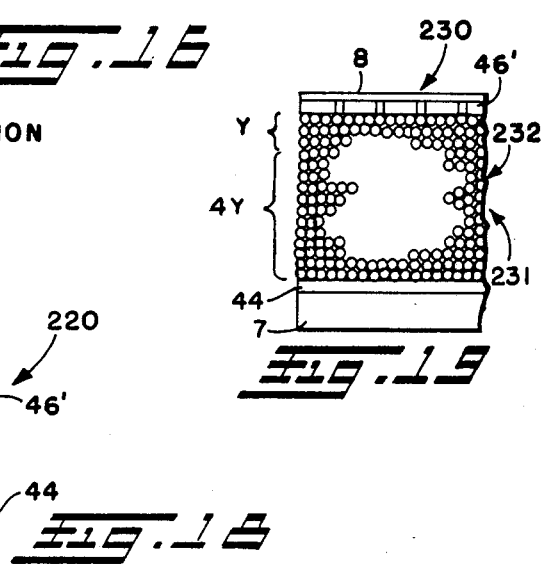
FIG. 18 is a fragmentary enlarged schematic view of a liquid crystal color display using two different size capsules in the respective multiple layers thereof.
FIG. 19 is a fragmentary enlarged schematic view of a liquid crystal color display having liquid crystal layers of unequal thickness.

Briefly referring to FIG. 18, a multicolor display device 220, according to the invention, is illustrated. Such device 220 has two layers 221, 222 of volumes or capsules 223, 224 of liquid crystal. The liquid crystal in layer 221 is dyed one color, and that in the other layer 222 is dyed a different color. The total thickness of each layer, though, preferably is the same, since the impedance and dielectric values of the layers would be the same; this helps assure balanced operation and balanced electrical and optical effects. As a result, each layer is the same thickness, has similar properties, has the same concentration dye and, thus, the same effective filtering capablity. However, the liquid crystal in the layer 221 having the larger volume capsules 223 switches at a relatively lower voltage and the liquid crystal in the layer 222 of smaller volumes 224 requires a relatively greater voltage to switch on to the aligned generally transparent mode.

The above described volume/capsule size considerations, as well as the various other features of the invention may be used together to achieve the particular operational characteristics of multicolor subtractive color or serial filtering accomplished in the multicolor optical devices of the invention as are described in detail above.

Thus, it will be appreciated that using the above materials, it is possible to address different colors in a multicolor liquid crystal display using encapsulated liquid crystal materials.

EXAMPLE 6

In this example both voltage and frequency are used to discriminate the input to a pair of different liquid crystal materials. Moreover, in this example one of the dyes actually cannot be encapsulated with the Gantrez according to the method described above with the cross-linking to obtain isolating capsules, because the dye contains alcohol and would react with the Gantrez.

Materials: Separate layers of encapsulated liquid crystal material, each having a different color pleochroic dye therein. Referring to FIG. 17 for this example, layer 211 has indophenol blue dye and is formed of the 5% organo liquid crystal material identified above. Layer 213 has Sudan-III (red) pleochroic dye therein and is formed of 2461 liquid crystal which is frequency dependent, vis-a-vis dielectric anisotropy. Layer 211 is comprised of isolating cross-linked capsules, and layer 213 is comprised of a stable emulsion of volumes of dyed liquid crystal in a polyvinyl alcohol containment medium. The threshold level of the 5% cyano liquid crystal material to turn on/align with respect to the field exceeds that of the 2461 liquid crystal (at low frequency).

Operation: When no field is applied, both layers 211 and 213 are field-off and for incident white light input the output is dark or black. In response to an input electrical field of low voltage and low frequency, the 2461 layer turns on (liquid crystal aligns) and dye therein becomes effectively transparent, while the blue dye in the 5% material layer continues filtering to produce a blue output. At high voltage and low frequency, the 5% material turns on and the 2461 material stays on, whereupon the display is clear. At low voltage, high frequency, the 2461 material turns off and the 5% material stays on, whereupon the display produces a red output.

Advantages of such voltage/frequency discrimination by the liquid crystal material itself is that no intermediate electrode is required; absorption caused by such electrode is eliminated. Also, only two electrical terminals would be required for the multicolor device and only one single cast may be required to make the device.

Using exclusively the above-described cross-linked capsules, and consistent with the several examples described herein, a first layer of one color dyed encapsulated liquid crystal material could be cast on a support, followed by a second layer of a different color dyed encapsulated liquid crystal material, and, if desired, even a third, etc. Each liquid crystal material may be responsive to a different voltage or frequency than the other(s) to achieve discrimination of input field to produce a multicolor output. It also would be possible to mix the differently colored capsules of the isolating cross-linked type to achieve a homogeneous mixture or distribution thereof. Such mixture, which would be responsive to or discriminating with respect to different switching voltages or frequencies, could be used to achieve the desired multicolor response using only a single pair of electrodes.

BALANCING ELECTRICAL CHARACTERISTICS

While, on the one hand, it is desirable to achieve the abovementioned electric field discriminating function, on the other hand it is desirable to balance the electrical characteristics of the liquid crystal layers. In particular, it would be desirable to balance electrical impedance of the layers so that for a given input field the voltage drop across each layer would be at least about the same. Such balance facilitates operational consideration as each layer or capsule discriminates the applied electric field. Although it is possible for a multicolor display, e.g. of the type disclosed in FIG. 17, for example, to function with electrically unbalanced characteristics, the achieving of desired balance simplifies construction and operation of the display. Such balancing also may facilitate the discrimination function and may prevent possible damage to the liquid crystal material and/or containment medium due to over-driving by excessive voltage to switch one or both layers of an electrically unbalanced display.

To accomplish electrical balancing of plural liquid color layers, it may be necessary for the layers to be different thicknesses because the dielectric constants/-coefficients of the different liquid crystal materials often are different. However, as one layer is made proportionally thicker than another, compensation of dye concentration, namely a reduction in dye concentration in a given layer as it is made thicker, is desirable to maintain substantial balance in the color filtering effects of the respective layers. Such balancing of dye concentration may be according to an equation for intensity I of light transmitted through a liquid crystal layer containing pleochroic dye as a function of the incident light intensity $I_o$, thickness T of the layer, and concentration B of the dye in that layer, as follows:

$$I = I_o e^{-BT}.$$

If desired, although more complex, the filtering effect of the respective layers 2, 3 and the electrical considerations could be unbalanced, e.g. by having the layers of equal thickness with dyes of the same or different concentration, etc.

The following Examples 7-9 demonstrate the aforementioned balancing considerations in liquid crystal color layers of a multicolor liquid crystal display.

EXAMPLE 7

This is an example of balancing electrical characteristics of the encapsulated liquid crystal, on the one hand, and the intensity or filtering capability of the dye, on the other hand. A multicolor device 230 embodying this example is illustrated in FIG. 19.

1. Materials:

a. 40% cyano liquid crystal mixture mixed with indophenol blue pleochroic dye. The concentration of dye in this first layer 231 will be one-fourth the concentration of dye used in the second layer because the thickness of this first liquid crystal layer will be four times the thickness of the second liquid crystal layer in order to achieve the desired balance of electrical characteristics between the two layers to accomplish the operation below.

b. 10% cyano liquid crystal mixture mixed with Sudan-III(red) pleochroic dye in this two dye multicolor system. However, note, as was mentioned above, the concentration of dye in the instant layer 232 will be four times the concentration of dye in the first-mentioned layer 231; but the thickness of this instant layer 232 will be only one fourth the thickness of the first-mentioned layer.

2. Operational effects: Due to the electrical characteristics of the liquid crystal, e.g. dielectric constants/-coefficients and/or switching field voltage requirements, and the thickness of the respective layers 231, 232, the electric field applied to the display 230 will be divided substantially equally across the layers 231 and 232. The 40% cyano would switch to on or clear first, as the applied voltage increases. Subsequently, i.e. at a greater voltage, the 10% cyano material would switch on. Therefore, for increasing voltage, the following operation occurs a. Black when both unswitched.

b. Red, as the 40% cyano switches on.

c. Clear, as the 10% cyano also switches on.

The examples described herein generally will work for quite a few different dyes and dye combinations. Note that to achieve a black when both liquid crystal materials are unswitched, the colors must be true complementary colors. It is the use of such complementary colors that actually results in a true subtractive color operation. Nevertheless, operation still would proceed even if additive colors were used.

EXAMPLE 8

This example is the same as Example 7 except that a yellow (negative blue) dye and a true blue dye were used. The results for increasing voltage are, as follows:

a. Both off: Black.

b. One or the other on: Yellow or blue.

c. Both on: Clear.

According to the invention, plural pleochroic dyes may be mixed to derive a dye that is a different color or has different properties relative to the constituents. For example, Sudan-I and indophenol blue pleochroic dyes may be mixed for the purpose of forming a green dye, which is used as the dye for one of the encapsulated liquid crystal materials, e.g. in the multicolor display device 200 of FIG. 16 or in the following Example 9. Currently there is no good green pleochroic dye having suitable color and longevity/non-fade characteristics, and that is why the mixture is useful.

EXAMPLE 9

This example is the same as Examples 7 and 8, except that a mixture of Sudan-I and indophenol blue pleochroic dyes were used as a green dye and D-37 magenta pleochroic dye was used as the other dye. In operation the multicolor device worked, as follows:

a. Both off: Black.
b. One or the other on: Green or magenta.
c. Both on: Clear.

Note in all examples above, the dye can be mixed in either direction. Concentration of the dye plays a big part in balancing out the absorption characteristics of the materials used and of the resulting color output. These can be determined pragmatically, if desired. Importantly, though, the electrical characteristics of the layers are balanced to facilitate application of electric field and determination of the discrimination and/or other operational functions of the multicolor display device according to the invention.

Relying on the use of the above-described cross over liquid crystal material or equivalent type of material, a convenient multiplexed driving technique may be employed selectively to provide (or not) appropriate prescribed electrical input to the liquid crystal material(s) to effect alignment or not of the structure thereof with respect to applied electric field. A liquid crystal device 300 shown in FIGS. 21 and 22 uses such multiplexed driving technique.

Referring to FIGS. 21 and 22, the liquid crystal device 300 has plural, two are shown, layers 302, 304 of volumes 306, 308 of liquid crystal material 310, 312. The liquid crystal 310 in the first layer 302 is cross over liquid crystal material that has a first cross over frequency. The liquid crystal material 312 in the second layer 304 may be non-cross over liquid crystal material or may be cross over liquid crystal material having the same or a different cross over frequency than the first liquid crystal material 310. One example of cross over liquid crystal material is the 2461 material mentioned above. Another example is described by Bucher et al in "Frequency-Addressed Liquid Crystal Field Effect", *Applied Physics Letters*, Vol. 25, No. 4, 15 Aug. 1974, pages 186-188. The entire disclosure of Bucher et al is incorporated by reference.

For the purposes of the following example, the liquid crystal material 310 is of the cross over type and the liquid crystal material 312 is of the non-cross over type. Moreover, the cross over liquid crystal material 310 has positive dielectric anisotropy when the electric field applied thereacross is at relatively low frequency and has negative dielectric anisotropy at relatively higher frequency; the liquid crystal material 312 has positive dielectric anisotropy. Further, the voltages required to initiate a tendency of the liquid crystal material to align and to achieve full alignment with respect to applied electric field vis-a-vis the liquid crystal materials 310, 312 are different. Other parameters, such as alignment responsiveness voltages also may be selected for various other embodiments within the spirit and scope of the invention.

The liquid crystal device 300 also includes at least two electrodes 320, 322 for applying electric field across the liquid crystal materials. The electrode 320 preferably is in the form of a plurality of electrode strips 320a, 320b, etc. most clearly seen in FIG. 22. The electrode 322 similarly preferably is formed of a plurality of electrode strips 322a, 322b, etc., which are aligned parallel with each other and in non-parallel relation with respect to the electrode strips 320. Most preferably, the electrode strips 320 are orthogonal with respect to the electrode strips 322, whereby at the area where respective electrode strips cross, a pixel or pixel-like area is defined therebetween. Thus, for example, the liquid crystal material of the device 300 located substantially directly between the aligned portions of electrode strips 320a, 322a defines a pixel or pixel-like area that can effect coloring or filtering of light, on the one hand, or transmission of light on the other, without coloring the same. The assemblage of pixels formed by the volumes of liquid crystal and electrodes 320, 322 may be employed to form a liquid crystal display capable of producing a particular optical or visually perceivable output as a function of the prescribed inputs to the device 300.

A power supply and drive circuit 330, for example of conventional design, is associated with the liquid crystal device 300 selectively to apply electric field of a prescribed type input, for example being able to alter voltage, frequency, and/or phase of applied electric signal to respective electrodes, or not to apply prescribed input to respective electrodes. Accordingly, under the energization of the power supply and drive circuit 330, and in cooperation therewith, the liquid crystal device 300 is operative as an optical display device preferably capable to produce a multicolor output.

The power supply and drive circuit 330 may be of the type that produces electrical signals useful in a matrix addressing/multiplex scheme selectively to cause or not to cause responsive parallel alignment of liquid crystal structure in respective volumes 306, 308 of liquid crystal material 310, 312. Examples of such electrical signals and liquid crystal driving technique are disclosed in the following published articles: Paul R. Gerber, "Two-Frequency Addressing Of A Cholesteric Texture Change Electro-Optical Effect", *Applied Physics Letters*, Vol. 44, No. 9, May, 1984, pages 932-934; and van Doorn et al, "Two-Frequency 100-Line Addressing Of A Reflective Twisted-Nematic Liquid-Crystal Matrix Display", *Journal of Applied Physics*, Vol. 50, No. 2, Feb., 1979, pages 1066-1070. The entire disclosures of such articles hereby are incorporated by reference.

Using the driving schemes disclosed by van Doorn et al and by Gerber, various low frequency and high frequency signal portions of controlled amplitude, for example as a function of actual power supply amplitude and/or phase relation of signals, can be generated to effect the desired responsive alignment or not of liquid crystal structure in respective volumes of liquid crystal material in the liquid crystal device 300.

In FIG. 23 are illustrated a number of voltage waveforms used according to the matrix-addressing technique of Gerber. Voltage waveform 332 has an amplitude of $2V_0$; and the voltage waveforms 334a, 334b, 334c have an amplitude of $V_0$. Such voltage waveforms have both high frequency portions generally designated H and relatively low frequency portions generally designated L. The period of the high frequency portion H of each waveform, i.e. the total time during which the high frequency portion is produced, and the voltage amplitude $V_0$ and $2V_0$ are selected such that application of the voltage by a single one of such signals for that period or duration would not cause a change in the alignment of liquid crystal structure; and the same is true for the relationship of the voltage $V_0$ and period or duration of the low frequency portion L of each voltage waveforms 332 and 334. The difference between the voltage waveforms 334a, 334b, 334c is in the phase relationship of the respective high and low frequency portions thereof to the phases of the high and low frequency portions of the waveform 332. Thus, the high frequency portion of waveform 334a is 180° out of phase or phase reversed relative to the phase of the high frequency portion of the waveform 332; the low frequency portions of the waveforms or signals 334a, 332 are in phase. The high frequency portions of the signals 334b and 332 are in phase; and the low frequency portions thereof are phase reversed, i.e. 180° out of phase. The high frequency portion of the signals 334c, 332 are in phase, and the low frequency portions thereof also are in phase.

In FIG. 23 reference numeral 336 represents a row of pixels of the device 300, for example along the electrode strip 320a, that are unswitched due to the fact that no signal 332 is applied thereto. Such non-selected row is depicted at 336 with a plurality of unswitched pixel elements designated by the letter "u". The device 300 and, accordingly, the line 336 may include more than the representatively depicted three pixels. Although one of the signals 334 may be applied to one or more of the respective electrode strips of the electrode 322 that align with the electrode strip 320a of the pixel row 336, as was mentioned above, the amplitude of the voltage 334 alone and the duration of the respective portions thereof preferably are inadequate to effect switching or alignment of liquid crystal structure with respect to electric field between respective electrode strips.

Reference numeral 338 in FIG. 23 represents a row of pixels of the device 300 to which the signal 332 is applied, for example the row of pixels aligned with the electrode strip 320b. Signals 334a, 334b, 334c may be delivered to respective electrode strips 322a, 322b, 322c, for example. Pixels 340a, 340b, 340c of the device 300 are the ones represented in line 338 of FIG. 23.

At pixel 340a the high frequency portions of the signals 332, 334a are out of phase; therefore, a high frequency voltage having an effective amplitude of $3V_0$ is applied to the pixel 340a. The amplitude $3V_0$ is adequate to align the structure of the non-cross over liquid crystal material 312 in the volumes 308 with respect to the applied electric field, thereby to minimize, preferably as close to zero as possible, any color filtering by such liquid crystal (and pleochroic dye contained therein). Thus, at pixel 340a in row 338 of FIG. 23 the lower portion of such pixel is designated with a letter "s" indicating that such non-cross over liquid crystal material is switched to alignment. However, the frequency of such high frequency signal is above the cross over frequency of the cross over liquid crystal material 310 in the volumes 306, and, therefore, the structure of such liquid crystal and the pleochroic dye therein will align normal to the applied field (the liquid crystal then having negative dielectric anisotropy) or, in any event, generally will not be parallel to such field. Therefore, the result of such volumes of cross over liquid crystal material and pleochroic dye therein will be to cause color filtering or coloring of light transmitted therethrough. A letter "u" at pixel 340a in row 338 of FIG. 23 indicates the unswitched or in any event color filtering status of the cross over liquid crystal material of the pixel.

With the foregoing in mind, it will be appreciated that when the signal waveform 332 is applied to an electrode strip, say strip 320b, and signal waveform 334b is applied to an electrode strip, such as strip 322b, both the cross over and non-cross over liquid crystal materials 310, 312 in volumes 306, 308 will be switched to align with the applied electric field. Such alignment is effected because the high frequency portions of the applied signals are in phase and, therefore, have a net amplitude of $2V_0$, which is too small to effect alignment or dielectric anisotropy cross over. On the other hand, the low frequency portions of the applied signal voltages are frequency shifted relative to each other so that they are 180° out of phase and apply a net low frequency voltage equal to $3V_0$. Accordingly, pixel 340b provides minimal filtering, preferably no filtering, of light transmitted therethrough. Therefore, on line 338 in FIG. 23, both liquid crystal materials are shown being switched, these conditions being represented by the letter "s". At pixel 340c represented in line 338 of FIG. 23, the liquid crystal materials 310, 312 in volumes 306, 308 of such pixel are unswitched and effect filtering of light transmitted therethrough as a function of the pleochroic dye in the respective liquid crystal materials because the voltage waveform 334c (for example applied to electrode strip 322c) has both high and low frequency portions that are in phase with the respective high and low frequency portions of the voltage waveform 332 applied to electrode strip 320b.

The foregoing description relative to FIGS. 21, 22 and 23 is presented by way of example to demonstrate one form of two-frequency matrix addressing technique to effect operation of the liquid crystal device 300. A particular advantage to the frequency shifting technique described is that the voltage waveforms, for example 332, 334, may be of the type that are computer generated and/or computer controlled to achieve the desired frequencies and/or amplitudes and, importantly, phase relationships. Additionally, a further superimposed steady low-frequency voltage may be applied, as is described in the van Doorn et al article mentioned above. Further, one or more of the signals 332, 334 may be turned on and off, and the responsive alignment of the one of the liquid crystal materials, e.g. the cross over type, may be below that of such signal, thus enabling either liquid crystal material or both to be brought into responsive alignment (reduced color filtering), as is described generally above.

In the above description concerning FIGS. 21-23, the power supply and drive circuit 330 is coupled to a pair of electrodes 320, 322 selectively to apply power to effect a discernible output from the liquid crystal device 300. Such device 300 is shown as two separate layers 302, 304 of volumes of liquid crystal material. However, it will be appreciated that the volumes of liquid crystal material may be arranged in the distributed form mentioned above, for example, with respect to FIG. 16. Moreover, it will be appreciated that the two-frequency phase shifting technique described with reference to the liquid crystal device 300 of FIGS. 21 and 22 may be used to apply electric field only to a single group or layer of volumes of cross over liquid crystal material selectively to determine the optical properties thereof. A separate voltage waveform or group of voltage waveforms may be used to provide electric field across a separate group or layer of volumes of liquid crystal material arranged in the layered fashion depicted particularly in FIG. 24.

Referring briefly to FIG. 24, a modified liquid crystal device 300' is illustrated. The device 300' is similar to the device 300 described above with reference to FIGS. 21-23; in FIG. 24 parts designated by primed reference numerals correspond with parts designated by unprimed reference numerals in FIG. 21. The primary difference between the device 300' and the device 300 is that the device 300' uses the electrodes 320', 322' to apply electric field only to the volumes 306' of cross over liquid crystal material 310' in the layer 302'; and a further electrode 324 (preferably comprised of a plurality of electrode strips like the electrode 320' and arranged in crossed relation to the electrode strips of the electrode 322') cooperates with the electrode 322' to apply electric field to the volumes 308' of liquid crystal material 312' in the separate layer 304'. Thus, the electrode 322 is a shared one. The power supply and drive circuit 330' may be substantially the same as the circuit 330 providing appropriate output not only to drive respective pixels 340a', 340b', 340c' in the layer 302' but also to drive the remaining parts of such pixel-like areas in the layer 304'.

With the liquid crystal material 320' being of the cross over type, adequate voltage of high frequency would cause negative dielectric anisotropy; adequate voltage of low frequency would cause alignment in parallel to the electric field and minimum color filtering by the layer 302'. With the liquid crystal material 312' being of the non-cross over type, the power supply and drive circuit 330' would only have to apply DC voltage, low frequency voltage or high frequency voltage, or a combination thereof, of adequate amplitude to effect switched alignment in parallel with the electric field. By effecting a time multiplexed output from the power supply and drive circuit 330' to the electrodes 320', 322', 324, the electrode pair 320', 322' may be used to determine aligned or not status of liquid crystal material in layer 302' and the electrode pair 322', 324 may be used to determine the alignment condition of the liquid crystal material in the layer 304'. Thus, by coordinating operation of the power supply and drive circuit 330' with the electrodes 320', 322', 324 and with the particular colors of the liquid crystal in the layers 302', 304', it is possible to produce a desired multicolor output using the above-described principles of subtractive color operation.

Figure 25:
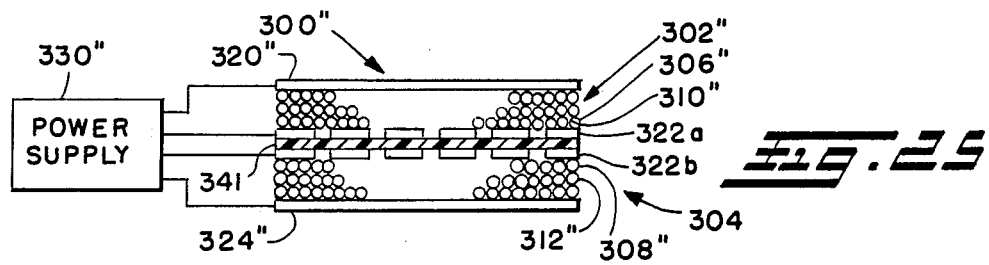

In FIG. 25 is illustrated a further alternate embodiment of liquid crystal device 300". In FIG. 25 the elements designated by double primed reference numerals correspond generally to the elements identified by primed reference numerals or unprimed reference numerals in FIGS. 21 and 24. In the liquid crystal device 300" there are two layers 302", 304" of volumes 306", 308" of cross over liquid crystal material 310" and non-cross over liquid crystal material 312", as is illustrated. Although the liquid crystal device 300' of FIG. 24 used a shared electrode 322', the liquid crystal device 300" uses respective dedicated electrodes 322a", 322b", which are separated by electrical insulation 341. The power supply and drive circuit 330" provides voltage signals to the electrodes 320", 322a" in the manner described above with reference to FIGS. 21-24, for example, using the two frequency signal technique to cause alignment or non-alignment of liquid crystal material in the layer 302". The power supply and drive circuit 330" also provides voltage signals to electrodes 322b", 324" to determine the structural alignment of the liquid crystal material in the layer 304". Since a separate electrode pair is used for each of the liquid crystal layers in the device 300", the complexity of time multiplexed control of the power supply and drive circuit 330" may be less stringent than that required for the shared electrode arrangement of the device 300' and power supply and drive circuit 330' of FIG. 24. Operation of the device 300" generally follows that described above with reference to the devices 300, 300' with respect to subtractive color operative principles.

In view of the foregoing, it will be appreciated that the two frequency energization technique may be used particularly advantageously with cross over liquid crystal material. Moreover, the phase shifting technique, for example using relatively low frequency signals, e.g. as in the low frequency portions of the signals 332, 334 of FIG. 23, may be used to effect selective alignment of liquid crystal structure of both cross over and non-cross over liquid crystal materials in the various embodiments of liquid crystal display disclosed herein.

One advantage of the just described operation of the liquid crystal device is the ability to function turning liquid crystal material "on" and "off", i.e. aligned and non-aligned, to effect specified optical results in response to phase variations in signals without having to apply and to remove a voltage. Rapid application and/or removal of voltages can cause undesired transients; whereas the change in relative phase of one or more AC signals ordinarily would not result in such transients. Another advantage of the just described operation is the ability to force a given layer of liquid crystal to an "off" or non-aligned condition to overcome the side effects of miscellaneous electrical noise that might otherwise inadvertently cause the liquid crystal to turn "on" to parallel alignment condition.

Although the above description of multiplex operation using cross over liquid crystal material has been described with use in a two layer liquid crystal device 300, 300', it will be appreciated that the several multiplex concepts hereof may be used in liquid crystal devices that have more than two layers. For example, using a four layer device with six electrodes; namely, double the liquid crystal device 300, 300' of FIGS. 21, 22 and 24 with both devices in optical serial relation to each other.

Figure 26:
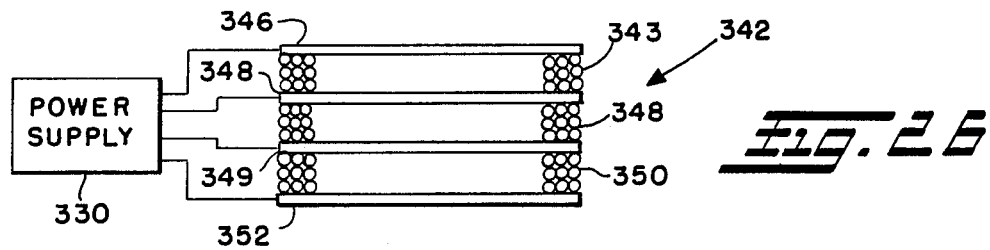
FIG. 26 is a schematic illustration of a liquid crystal display device using multiplex and multi-frequency/phase shifting driving for plural liquid crystal layers together with non-multiplex driving for a third liquid crystal layer.

Moreover, it will be appreciated that the multiplex principles of operation herein described may be used in a three layer liquid crystal device 342 of the type illustrated in FIG. 26, which is similar in construction to the liquid crystal display device of FIG. 1. In the device 342 there are a first pair of liquid crystal layers 343, 344 with cross over liquid crystal material therein and three electrodes 346, 348, 349 together with a power supply and drive circuit 330 as above. The device 342 also includes a further liquid crystal layer 350 (providing the third layer) that has non-cross over liquid crystal therein. Accordingly, in such a device the multiplex operation may be used for driving the first two layers with cross over liquid crystal material therein while one of the signal electrodes proximate the third liquid crystal layer and a fourth electrode 352, provide selective electric field or not to respective pixel-like areas of the third layer 350. Using the shared signal electrode, pixels of the third layer would be turned on or off by applying on the electrode 352 a signal similar to the signal 332, 334 but with both the low and high frequency components of the signal on the electrode 352 being either in phase or out of phase by 180° with the signal on such shared electrode 349.

Figure 27:
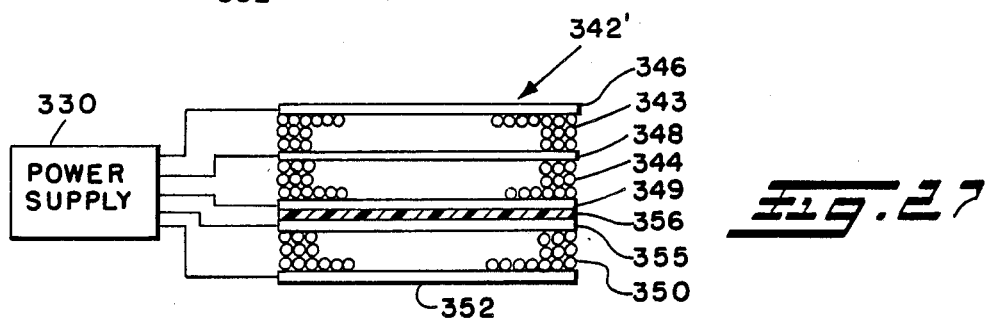
FIG. 27 is a schematic illustration of a liquid crystal display device like that of FIG. 26 but also having a separate pair of electrodes for driving the third liquid crystal layer.

On the other hand, as is seen in FIG. 27, wherein parts similar to those illustrated in FIG. 26 are designated by the same reference number, a modified liquid crystal device 342' includes a separate electrode 355 used with the third liquid crystal layer 350 to cooperate with the electrode 352 to apply or not electric field to such third layer. The electrode 355 may be separated from the electrode 349 by an insulator 356. In FIG. 27 the several parts correspond generally in form and function to the parts illustrated in FIG. 26.

The aforementioned multiplexing and/or frequency/phase shifting approach may be used selectively to provide prescribed input to plural volumes of different liquid crystal distributed in a substantially homogeneous layer, e.g. as is illustrated in FIG. 16. In such case the power supply and drive circuit 330 may provide respective signals 332, 334, for example to the electrodes 44, 46' of the liquid crystal display device 200 of FIG. 16 so as to cause parallel alignment or not of the liquid crystal in the respective volumes 202, 203. In such operation, appropriate magnitude of voltage and/or frequency of voltage may be applied to respective pixel-like areas of the layer 201 to effect parallel or non-parallel alignment of the liquid crystal material in respective volumes thereby to produce a selective color output.

Furthermore, it will be appreciated that the multiplexing technique described herein provides for more than two frequency components in the respective signals, e.g. to accommodate multiple liquid crystal materials that have different frequency threshold levels at which cross over of dielectric anisotropy occurs. Thus, for example, the signals 332, 334 may have a still higher frequency component than those illustrated in FIG. 23. Operation of such a liquid crystal device with such relatively highest frequency component or term would be similar to the liquid crystal device 300, for example, described above with reference to FIG. 21.

Figure 28:
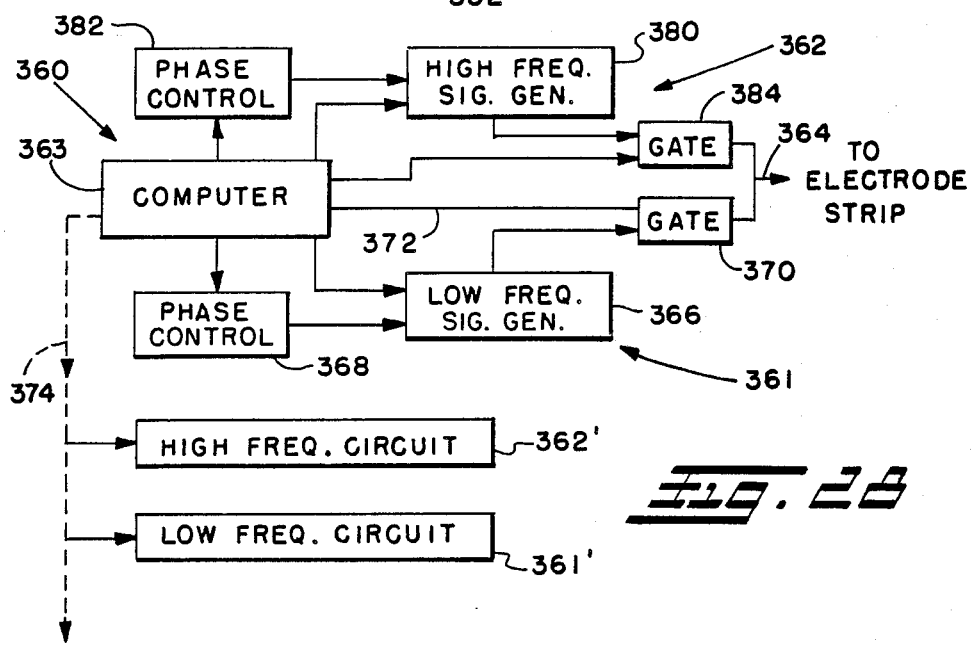
FIG. 28 is a schematic circuit diagram of a representative driving circuit.

An exemplary circuit 360 in FIG. 28 may be used to develop the two-frequency signals of the articles mentioned above, for example with reference to the liquid crystal devices 300, 300', 300" of FIGS. 21-25. The circuit 400 may be included as part of the power supply and drive circuits 330, 330', 330" to generate each signal applied to a respective electrode 320, 322, 324, and so on.

In circuit 360 there are low and high frequency circuit portions 361, 362, and a computer 363 controls signal generation and/or phase of each signal as well as the time during which a given signal is delivered to a respective electrode. Although not shown, a further multiplex circuit of conventional design may be used under control of the computer 363 selectively to couple the signal output on output line 364 to respective electrode strips.

In the low frequency portion 361 of circuit 360 a low frequency signal generator 366, such as a free running multivibrator, produces a low frequency signal of from several to several thousand Hz. The frequency is below cross-over frequency of liquid crystal material that may be used in a given display 300, for example. The relative phase of such signal is determined by the phase control circuit 368 as determined by the computer 363. The low frequency signal produced by the low frequency signal generator 366 is provided to a gate circuit 370 which passes such signal to output 364 when selected by a signal on line 372 from the computer.

Dotted line 374 indicates that the computer 363 may be coupled to one or more other low frequency circuit 361', which include(s) phase control, low frequency signal generator and gate to develop another low frequency signal for delivery, say, to another electrode of a liquid crystal device 300. For example, the low frequency signal on output 364 may be coupled to one of the strips of electrode 320 (FIG. 21) and the output from the other low frequency circuit may be coupled to a strip of electrode 322. Depending on the phase relation of such signals responsive alignment of liquid crystal material can be effected, as was described above.

The high frequency circuit portion 362 of circuit 360 includes a high frequency signal generator 380, phase control 382, and gate circuit 384. The high frequency portion is controlled by the computer 363, as is the low frequency portion, selectively to produce a relatively high frequency signal of a given phase on output 364. The high frequency preferably is above the cross over frequency of cross over liquid crystal material used in the display 300, for example. Line 374 represents connection to another high frequency circuit portion 362' under control of computer 363 to develop a similar high frequency signal, for example. The respective high frequency signals may be coupled to respective electrodes or electrode strips and may be controlled to have a particular phase relation to determine responsive alignment of liquid crystal structure generally as was described above with reference to the devices 300, 300', 300".

Figure 29:
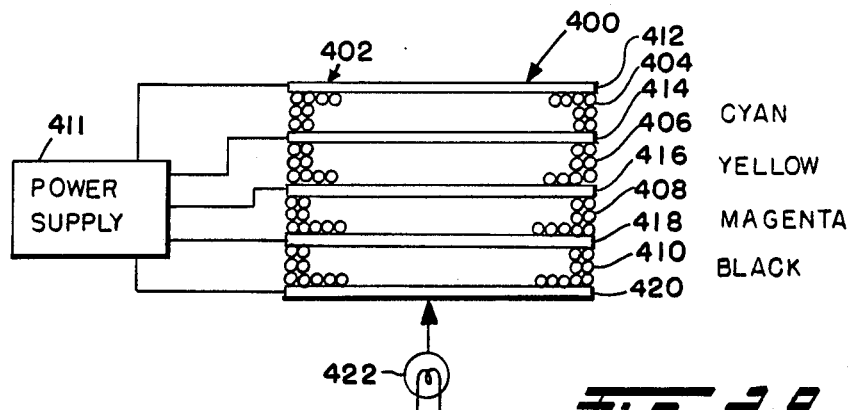
FIG. 29 is a schematic illustration of a liquid crystal pixel having four liquid crystal layers, one of which contains black pleochroic dye.

Turning now to FIG. 29, a pixel 400 of a liquid crystal display device 402 is illustrated. The liquid crystal device 402 has four liquid crystal layers 404, 406, 408, 410 formed of volumes of operationally nematic liquid crystal in a containment medium, with different respective pleochroic dyes in the liquid crystal of each layer. For example, as is illustrated, the dyes may be cyan, yellow, magenta and black. A prescribed input may be applied by a power supply 411 to the respective liquid crystal layers using respective electrodes 412, 414, 416, 418, 420 in one of the various techniques described hereinabove, for example, to achieve alignment or not of the liquid crystal and dye in the respective volumes and layers thereby to absorb or to transmit light, generally as has been described in greater detail elsewhere herein.

The black layer 410 gives saturation control independently of color. The color layers 404, 406, 408 operate subtractively. When the black layer 410 is field off/distorted, there is a large amount of blackening, i.e. black output or darkening of the output color light. However, as the field is applied, the amount of blackening and, thus, saturation, is reduced, for the light tends to pass through the black layer at full field on. If all color layers are field on, and the black layer is field off, then a black output is produced. If all the colors are on and the black also is on, then the output will be white or in any event generally the color of the illuminating source 422. The black layer 410 controls the brightness of light transmitted through the device. Therefore, a good match of the color dyes is not required to get a good black output. In contrast, to get black in a three color (non-black) system, it would be necessary to have a relatively good match of colors such that they would be true complementary colors.

As is seen in FIG. 29, there are five electrode layers. The electrodes may be formed in layers on transfer sheets that are applied directly to the liquid crystal layers. Preferably, the electrodes of each layer would be a plurality of electrode strips arranged in a crossed pattern to define individual pixel areas, for example as is represented at 400 of the liquid crystal display device 402, at each crossing of a respective pair of electrode strips.

Transmissive white is achieved in the embodiment of the invention depicted in FIG. 29, for example. Specifically, with all liquid crystal layers 404, 406, 408, 410 in field on condition, then the light transmitted is white, or in any event the color of the illuminating source. This relatively pure white may be contrasted with an RGB (red, green, blue color) system in which the colors are additive. In an RGB system, all three color red, green and blue color dots adjacent each other must be turned "on" to achieve the reflective function; but this results in only about ⅓ the brightness of a transmissive system because the three colors must be added to achieve a white output.

Desirably the liquid crystal color layers 404, 406, 408 in the display device 402 use liquid crystal material that has a low delta-N (i.e. birefringence) to achieve bright colors. The reason is to avoid scattering light when the liquid crystal material is in distorted alignment, for such scattering would tend to decrease resolution. Scattering the colors would tend to muddy the colors. Therefore, preferably the color output of each of such liquid crystal color layers preferably would be achieved using pleochroic dye in the liquid crystal material; and the liquid crystal material would be used primarily as a switch perhaps with some degree of analog characteristics to turn on, off or partly on or off the dye coloring effect.

The black liquid crystal layer 410 preferably should have a relatively high delta-N (birefringence) to give better control of intensity. Although the delta-N for the black layer could be any value and still work, it is believed best when relatively high for maximum black effect because the larger the difference between extraordinary index of refraction of the liquid crystal and containment medium thereof, the more scattering of light occurs and the greater the path length of light through the black dye.

Figure 30:
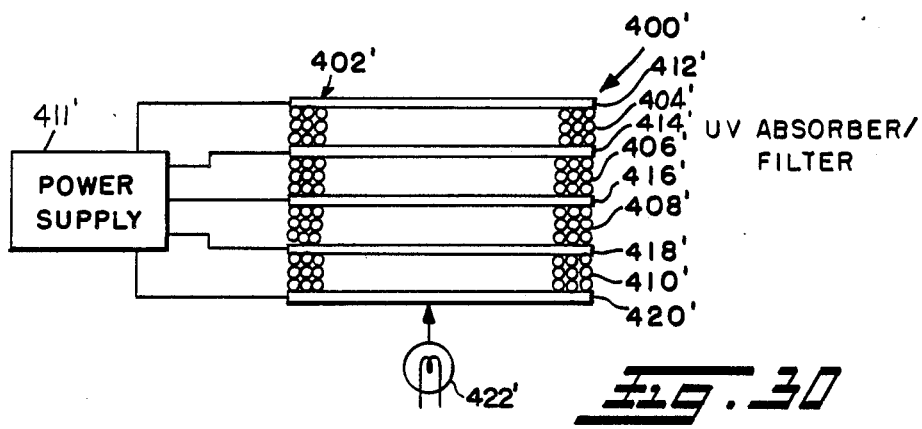
FIG. 30 is a schematic illustration of a liquid crystal pixel having four liquid crystal layers, the leading one of which contains a pleochroic dye that absorbs ultraviolet light.

Briefly referring to FIG. 30, a pixel 400' of a liquid crystal display device 402' is illustrated. In FIG. 30, parts corresponding to the pixel 400 described above with reference to FIG. 29 are designated with the same reference number carrying a prime designation, e.g. 400'. In the liquid crystal display 402' the dye in the liquid crystal layer most likely to be closest to exposure to ultraviolet radiation, e.g. the layer 404', is capable of filtering out the ultraviolet radiation components. This layer 404' then protects the other liquid crystal color layers 406', 408', 410' from ultraviolet radiation. It is known that ultraviolet radiation can cause degradation of pleochroic dye; and, therefore, the present invention provides for increased protection to avoid such degradation.

Figure 31:
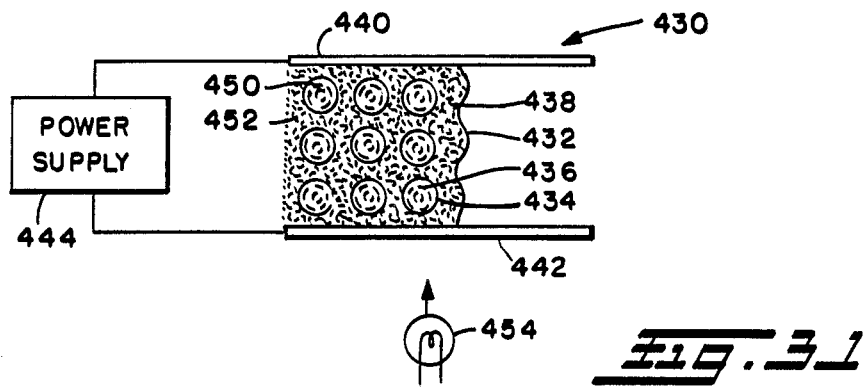
FIG. 31 is a schematic illustration of a liquid crystal color display according to a further and alternate embodiment of the invention using both pleochroic dye and non-pleochroic dye in a common liquid color layer.

According to an alternate embodiment of the present invention both pleochroic dye and non-pleochroic dye coloring functions may be combined in a single liquid crystal display device 430 illustrated in FIG. 31. As was mentioned above, the individual pixel-like areas of the various liquid crystal color display devices hereof may be relatively small and so closely positioned as to effect an additive color function of the type found in RGB color systems, for example. Such additive operation may be employed in the liquid crystal color display device 430, for example depending on the color dyes used and the pixel sizes. Alternatively, the device 430 may be used more on a macro size basis to display colors over relatively large areas not intended to undergo additive function.

The liquid crystal color display 430 includes a layer 432 of plural volumes 434 of operationally nematic liquid crystal 436 in a containment medium 438. Electrodes 440, 442 are provided to apply electric field to layer 432 or to parts thereof, for example using one of the above-described techniques. The electrodes may be strip electrodes, solid electrodes, etc. A power supply 444 provides appropriate electric field signals to the liquid crystal layers or parts thereof selectively to effect parallel alignment of the liquid crystal with the electric field or possibly to force non-alignment if cross over liquid crystal material is used, as was described above. Moreover, a light source 454 provides light for transmission through the device 430.

Pleochroic dye 450 is contained in plural volumes of liquid crystal 436 to function in guest host relation, whereby the dye structure follows the liquid crystal structure so as to absorb or to color light when distorted or not aligned generally in parallel with an applied electric field or generally with respect to the direction of propagation of light therethrough. Moreover, the amount of such absorption or coloring will reduce when the dye structure aligns in the direction of light propagation, e.g. when the liquid crystal structure is similarly aligned particularly generally in parallel with an applied electric field.

Importantly, the liquid crystal color display 430 also includes non-pleochroic dye 452. Such non-pleochroic dye may also be in the liquid crystal volumes, but preferably such non-pleochroic dye is in the containment medium 438. Both possibilities are disclosed in applicant's above-mentioned U.S. patent application Ser. No. 480,466. The non-pleochroic dye 452 may be added to the containment medium 438 or liquid crystal during the process of forming the same the volumes of liquid crystal, e.g. as a part of an emulsion of the liquid crystal material and containment medium. Alternatively, the non-pleochroic dye may be applied by imbibition using the techniques disclosed in applicant's above-mentioned U.S. patent application Ser. No. 480,461.

In operation of the liquid crystal color display device 430, when no field or other appropriate prescribed input is applied, the liquid crystal structure is distorted and both the pleochroic due 450 and the non-pleochroic dye will tend to absorb, filter or color light incident thereon from the source 454. On the other hand, when an appropriate prescribed input, e.g., an electric field, is applied to the volumes of liquid crystal, the liquid crystal structure aligns with respect to the field, and the coloring effect of the pleochroic dye is reduced; however, the coloring effect of the non-pleochroic dye continues. Thus, in off condition of the liquid crystal material, both dyes impact on the light transmitted through the device 430; in the on condition of the liquid crystal material, only the non-pleochroic dye will have impact.

The pleochroic dye and the non-pleochroic dye may be selected to cooperate with each other to produce color outputs not heretofore possible using pleochroic dye alone. Moreover, the pleochroic dye and the non-pleochroic dye may be selected to be complementary colors so that when both are acting to color light, the effect is black. On the other hand, when only the non-pleochric dye is coloring light, the output effect is the color of the non-pleochroic dye. Exemplary complementary colors would be a magenta pleochroic dye and a green non-pleochroic dye.

Importantly, using such combination of pleochoric dye and non-pleochroic dye, especially when they are a complementary color pair, the pleochroic dye can serve as a switch for the non-pleochroic dye coloring function. More generally, the pleochroic dye can serve as a switch for turning on or black an output from the device 430. Specifically, no light output or black would be produced in the absence of a prescribed input; a particular color output would be produced in the presence of the prescribed input. Using the just described technique, a multicolor display device can be made by employing in different pixel-like areas of the device 430 different respective color dyes, both pleochroic and non-pleochroic, of different respective complementary color pairs. The result is a multicolor display device of the type depicted generally in FIG. 10 for use, say, in a color television or like device.

It will be appreciated that the display device 430 just described provides in a single liquid crystal device of pixel-like size or area or larger size, multiple functions of coloring light and of switching a light output on and off. Indeed, such functions are accomplished according to the invention in a single layer device, as is illustrated in FIG. 31 and is described above.

From the foregoing, it also will be appreciated that the various aspects and features of the present invention disclosed herein may be incorporated in the liquid crystal display device 430 to effect subtractive coloring functions in a multi-layer liquid crystal device. Further, it will be understood that the several aspects and features of the present invention disclosed herein may be combined to achieve the various operations described.

Although the several embodiments of the invention have been illustrated and described above with a particular number of liquid crystal color layers or the like, it will be appreciated that the various principles of the invention may be used in similar embodiments of liquid crystal color displays that have more or fewer such layers and the layers may extend fully over the entire surface extent of the liquid crystal device using the same or may extend over less than the entire extent, as may be desired. Also, it will be appreciated that various forms and numbers of electrodes and circuits consistent with the invention may be employed to carry out the various functions and operations described herein. Further, it will be appreciated that consistent with the disclosure herein, the features of liquid crystal display devices of various embodiments may be included with other respective embodiments hereof.

TECHNICAL FIELD

It will be understood that the several features of the invention may be employed to produce a color output for educational, informational, entertainment, etc. purposes.

I claim:

1. An optical device, comprising an assemblage of plural groups of volumes of liquid crystal material, a plurality of said volumes comprising discrete capsules formed by containment medium of isolating polymer containing therein said liquid crystal material, the liquid crystal material in at least one of said groups comprising nematic or operationally nematic liquid crystal, the device being formed in such a way to maintain adequate resistivity to obtain a field across the liquid crystal material in response to an applied voltage to cause alignment of said liquid crystal material with respect to such field, said resistivity being obtained by purifying at least part of the containment medium prior to formation of the device.

2. An optical device, comprising plural groups of volumes of liquid crystal in a containment medium, a plurality of such groups containing in the volumes thereof respective pleochroic dye to color light transmitted therethrough, said volumes being arranged relative to each other in generally optically serial relation to affect color of light transmitted therethrough in a subtractive color operation, and at least one of such groups containing in the volumes thereof black pleochroic dye operative selectively to attenuate light incident thereon.

3. The device of claim 2, said group containing in the volumes thereof black pleochroic dye being operative to control brightness of light transmitted through the device.

4. The device of claim 2, said groups of volumes being responsive to application of a prescribed input to be substantially optically transmissive with minimum filtering of light transmitted therethrough, thereby to produce a substantially white output.

5. The device of claim 2, wherein each group of plural volumes is in a separate layer separated from one or more relatively adjacent layers by electrode means, said electrode means being operative for applying electric field to respective layers as a prescribed input to affect the alignment of liquid crystal structure and dye structure in such volumes.

6. The device of claim 5, wherein at least one layer is more proximately exposed to a source of external optical radiation than another layer, and the liquid crystal in said more proximately exposed layer includes pleochroic dye that removes at least a substantial amount of ultraviolet optical radiation from such optical radiation emitted by such source prior to passing such optical radiation to a less proximately exposed layer.

7. The device of claim 5, wherein said volumes distort the natural structure of the liquid crystal in the absence of an electric field, and in the presence of such electric field the liquid crystal structure tends to align with respect to such field.

8. The device of claim 7, such alignment in the presence of a field being generally parallel or perpendicular to the field.

9. The device of claim 5, wherein the liquid crystal material in at least one group of plural volumes comprises nematic or operationally nematic liquid crystal.

10. The device of claim 5, wherein said electrode means comprises plural strip-like electrodes on one side of one layer and plural strip-like electrodes on the other side of one layer to effect a crossed-electrode pattern thereby to define individual pixel-like areas between each pair of crossed electrodes.

11. The device of claim 10, wherein each of said electrode means comprises plural strip-like electrodes thereby to form crossed electrode patterns for each layer of plural volumes.

12. The device of claim 11, wherein there are four layers of plural volumes, three of such layers comprising color pleochroic dye, and a fourth such layer comprising black plepchroic dye, and said electrode means comprises five layers of electrodes, one layer at each side of each layer of liquid crystal volumes.

13. The device of claim 2, wherein there are four layers of plural volumes, three of such layers comprising color pleochroic dye, and a fourth such layer comprising black pleochroic dye, and said liquid crystal material in such three color layers having a relatively low difference between the ordinary and extraordinary indices of refraction and such indices being substantially matched to the index of refraction of such containment medium.

14. The device of claim 13, said liquid crystal material in such fourth black layer having a relatively high difference between the ordinary and extraordinary indices of refraction and the ordinary index of refraction of such liquid crystal material being substantially matched to the index of refraction of said containment medium of such group.

15. The device of claim 14, said electrode means comprises five layers of electrodes, one layer at each side of each layer of liquid crystal volumes.

16. The device of claim 15, wherein at least one layer is more proximately exposed to a source of external optical radiation than another layer, and the liquid crystal in said more proximately exposed layer includes pleochroic dye that removes at least a substantial amount of ultraviolet optical radiation from such optical radiation emitted by such source prior to passing such optical radiation to a less proximately exposed layer.

17. An optical device, comprising plural groups of volumes of liquid crystal in a containment medium, a plurality of such groups containing in the volumes thereof respective pleochroic dye to color light transmitted therethrough, said volumes being arranged relative to each other in generally optically serial relation to affect color of light transmitted therethrough in a subtractive color operation, and at least one of such groups containing in the volumes thereof black pleochroic dye operative selectively to attenuate light incident thereon, wherein each group of plural volumes is in a separate layer separated from one or more relatively adjacent layers by electrode means, said electrode means being operative for applying electric field to respective layers as a prescribed input to affect the alignment of liquid crystal structure and dye structure in such volumes, wherein at least one layer is more proximately exposed to a source of external optical radiation than another layer, and the liquid crystal in said more proximately exposed layer includes pleochroic dye that removes at least a substantial amount of ultraviolet optical radiation from such optical radiation emitted by such source prior to passing such optical radiation to a less proximately exposed layer, and wherein said volumes distort the natural structure of the liquid crystal in the absence of an electric field, and in the presence of such electric field the liquid crystal structure tends to aling with respect to such field.

18. A liquid crystal device, comprising a first plurality of volumes of a first liquid crystal material and a second plurality of volumes of a second liquid crystal material, said volumes being formed by containment medium means for tending to distort the natural structure of the liquid crystal material in the absence of a prescribed input, said second liquid crystal material having dielectric anisotropy that is frequency dependent so as to undergo a change in sign, whereby the optical transmission characteristics of the device are a function of the magnitude and frequency of prescribed input applied to said liquid crystal materials.

19. The device of claim 18, at least one of said liquid crystal materials being nematic or operationally nematic.

20. The device of claim 18, wherein in response to an applied electric field as such as prescribed input, at relatively low frequency the threshold level of said second liquid crystal material at which such liquid crystal structure aligns generally in parallel with respect to such field is lower than the threshold level of said first liquid crystal material, and at relatively high frequency the dielectric anisotropy of said second liquid crystal material changes sign, whereby the same becomes aligned relatively perpendicular generally with respect to such electric field.

21. The device of claim 18, further comprising pleochroic dye in said volumes of liquid crystal material, whereby at least one of the color, intensity, saturation or hue of light transmitted through said volumes of liquid crystal material and pleochroic dye is a function of alignment of such liquid crystal material and dye therein.

22. The device of claim 21, wherein the pleochroic dye in said first liquid crystal material is one color and the pleocroic dye in said second liquid crystal material is another color.

23. The device of claim 21, wherein in response to an applied electric field as such prescribed input, at relatively low frequency the threshold level of said second liquid crystal material at which such liquid crystal structure aligns generally in parallel with respect to such field is lower than the threshold level of said first liquid crystal material, and at relatively high frequency the dielectric anisotropy of said second liquid crystal material changes sign, whereby the same becomes aligned relatively perpendicular generally with respect to such electric field.

24. The device of claim 23, further comprising a third plurality of volumes of a liquid crystal material having a further pleochroic dye therein.

25. The device of claim 24, further comprising a fourth plurality of volumes of a liquid crystal material therin having a black pleochroic dye therein.

26. The device of claim 23, at least one of said liquid crystal materials being nematic or operationally nematic.

27. The device of claim 18, said first plurality of volumes comprising a plurality of isolating capsules of a containment medium containing said first liquid crystal material.

28. The device of claim 27, said isolating capsules being arranged in a first layer, and said second plurality of volumes of second liquid crystal material being arranged in a layer substantially separate and optically serially related to said first layer.

29. The device of claim 28, wherein said second plurality of volumes of second liquid crystal material comprises an emulsion of said second liquid crystal material and a second containment medium.

30. The device of claim 28, further comprising a single pair of electrode means for applying electric field to both said first layer and said second layer as such prescribed input thereto.

31. The device of claim 30, at least one of said electrode means comprises plural electrode strips.

32. The device of claim 31, wherein both pairs of electrode means comprises plural electrode strips respectively arranged on opposite sides of said layers in a crossed electrode pattern to form plural pixel-like areas therebetween.

33. The device of claim 32, said isolating capsules being arranged in a first layer, and said second plurality of volumes of second liquid crystal material comprising a plurality of volumes of said second liquid crystal material distributed within the plurality of isolating capsules, whereby plural volumes of said first and second pluralities thereof are arranged in generally optical serial relation.

34. The device of claim 33, said second plurality of volumes comprising a plurality of isolating capsules of a containment medium containing said second liquid crystal material.

35. A liquid crystal device, comprising a first plurality of volumes of a first liquid crystal material and a second plurality of volumes of a second liquid crystal material, said volumes being formed by containment medium means for tending to distort the natural structure of the liquid crystal material in the absence of a prescribed input, said second liquid crystal material having dielectric anisotropy that is frequency dependent, whereby the optical transmission characteristics of the device are a function of the magnitude and frequency of prescribed input applied to said liquid crystal materials, and said first plurality of volumes comprising a plurality of isolating capsules of a containment medium containing said first liquid crystal material, said isolating capsules being arranged in a first layer, and said second plurality of volumes of second liquid crystal material being arranged in a layer substantially separate and optically serially related to said first layer, and, wherein at least one layer is more proximately exposed to a source of external optical radiation than another layer, and the liquid crystal in said more proximately exposed layer includes pleochroic dye that removes at least a substantial amount of ultraviolet optical radiation from such optical radiation emitted by such source prior to passing such optical radiation to a less proximately exposed layer.

36. A liquid crystal device, comprising a first plurality of volumes of a first liquid crystal material and a second plurality of volumes of a second liquid crystal material, said volumes being formed by containment medium means for tending to distort the natural structure of the liquid crystal material in the absence of a prescribed input, said second liquid crystal material having dielectric anisotropy that is frequency dependent, whereby the optical transmission characteristics of the device are a function of the magnitude and frequency of prescribed input applied to said liquid crystal materials, and, wherein at least one of said liquid crystal materials has a cross-over with respect to frequency of the dielectric anisotropy.

37. The device of claim 36, wherein both liquid crystal materials have a cross-over with respect to frequency of the dielectric anisotropy.

38. The device of claim 37, wherein such cross-over frequencies are different.

39. The device of claim 38, further comprising input means for supplying as a prescribed input to said volumes of liquid crystal material first and second electrical signals, each having a relatively low and a relatively high frequency component that are respectively additive to apply a resultant field to such volumes of liquid crystal material.

40. The device of claim 39, wherein said input means comprises circuit means for applying first and second electrical signals to said liquid crystal material such that the amplitude of each alone is less than the amplitude required to effect a responsive alignment function of liquid structure with respect thereto.

41. The device of claim 39, wherein said circuit means includes means for shifting the phase relation of at least one of the high and low frequency components of one electrical signal relative to the phase of the respective high and low frequency component of the other electrical signal.

42. Apparatus for signal discrimination, comprising plural volumes of liquid crystal material in a containment medium, said liquid crystal material having has a positive dielectric anisotropy in one frequency domain and a negative dielectric anisotropy in a second frequency domain, the effect of which is to discriminate between applied electrical inputs, and electrical input means for applying such electrical inputs to said liquid crystal material, and wherein said containment medium comprises a containment medium means for containing said liquid crystal material, said containment medium means including surface means for distorting the natural structure of the liquid crystal material in the absence of a prescribed electrical input, and such liquid crystal being responsive to an applied electric field in said one frequency domain to align generally in parallel with respect to such field and being responsive to an applied electric field in said second frequency domain to undergo non-alignment with respect thereto as a function of different polarity dielectric anisotropy of said liquid crystal.

43. The apparatus of claim 42, said liquid crystal comprising nematic of operationally nematic liquid crystal material.

44. The apparatus of claim 42, further comprising pleochroic dye in the liquid crystal material, whereby the color or brightness of light transmitted through said liquid crystal material is a function of such electrical inputs.

45. The apparatus of claim 44, further comprising a second plurality of volumes of a liquid crystal material, said second plurality of volumes having a different optical characteristic from the optical characteristic of said first plural volumes of liquid crystal and pleochroic dye, and said second plurality of volumes having a different electrical response characteristic to an applied electric field than the response characteristic of said first plural volumes of liquid crystal and pleochroic dye further to effect discrimination of electrical input.

46. The apparatus of claim 45, said second plurality of volumes of liquid crystal including pleochroic dye, and said different optical characteristic being a function of said pleochroic dye.

47. A liquid crystal device, comprising plural volumes of liquid crystal material, said liquid crystal material having a natural structure which in the absence of a prescribed input is distorted by surface means defining said volumes, whereby in response to such distortion said volumes of liquid crystal material at least one of scatter or absorb light, and further comprising input means for supplying as a prescribed input to said volumes of liquid crystal material first and second electrical signals, each having a relatively low and a relatively high frequency component that are respectively additive to apply a resultant field to such volumes of liquid crystal material, and wherein said liquid crystal material comprises cross over liquid crystal material having two different dielectric anisotropy characteristics as a function of frequency of input electrical signal thereto, and said input means comprises a circuit means for applying such first and second electrical signals such that the amplitude of each alone is less than the amplitude required to effect a responsive alignment function of liquid structure with respect thereto.

48. The device of claim 47, wherein said circuit means includes means for shifting the phase relation of at least one of the high and low frequency components of one electrical signal relative to the phase of the respective high and low frequency component of the other electrical signal.

49. The device of claim 47, further comprising pleochroic dye in said liquid crystal material, said dye being optically absorbing when said liquid crystal structure is aligned in generally distorted condition out of generally parallel alignment with an applied electric field; and said dye being generally optically transmissive and less absorbing when said liquid crystal structure is aligned generally in parallel with respect to an applied electric field.

50. The device of claim 47, said plural volumes being arranged in a first layer, and further comprising a second layer of plural volumes of liquid crystal material having a natural structure which in the absence of a prescribed input is distorted by surface means defining said volumes, whereby in response to such distortion said volumes of liquid crystal material at least one of scatter or absorb light, at least one of said liquid crystal materials comprising cross over liquid crystal material.

51. The device of claim 50, wherein said input means is operative to apply such electrical signals to both layers of volumes of liquid crystal material.

52. The device of claim 50, further comprising electrode means for applying such electrical signals to said layers of volumes of liquid crystal material, said electrode means including a scan electrode between said layers and respective signal electrodes on opposite sides of said layers relative to said scan electrode.

53. The device of claim 52, wherein each of said electrodes comprises plural electrode strips oriented such that said scan electrode strips are generally crossed relative to the signal electrode strips to define pixel-like areas of respective layers of volumes of liquid crystal material.

54. A liquid crystal color display, comprising a layer of plural volumes of operationally nematic liquid crystal in a containment medium, electrode means for applying electric field to said layer or to parts thereof, a power supply means for applying a prescribed input to said layer selectively to effect parallel alignment of the liquid crystal, and pleochroic dye in plural volumes of said liquid crystal and non-pleochroic dye in at least one of said liquid crystal and containment medium.

55. The display of claim 54, wherein said pleochroic dye has a structure that follows the liquid crystal structure so as to absorb or to color light when distorted or not aligned generally in parallel generally with respect to the direction of propagation of light therethrough and to reduce the amount of such absorption when the dye structure aligns generally in the direction of light propagation.

56. The display of claim 55, wherein said pleochroic dye and non-pleochroic dye are complementary colors.

57. A method of controlling light, comprising directing light to a liquid crystal device having a layer of plural volumes of operationally nematic liquid crystal in a containment medium, pleochroic dye in said liquid crystal and non-pleochroic dye in at least one of the containment medium and liquid crystal, such containment medium having surface means for distorting the natural structure of the liquid crystal in the absence of a prescribed input, when no prescribed input is applied allowing both the pleochroic dye and the non-pleochroic dye will tend to affect light incident thereon, and selectively applying a prescribed input to such liquid crystal material to reduce the coloring effect of the pleochroic dye while permitting the coloring effect of the non-pleochroic dye to continue coloring light.

58. The method of claim 57, further comprising selecting such dyes to be complementary colors to provide a black light output in the absence of such prescribed input and to provide a color output due to the non-pleochroic dye in the presence of such prescribed input.

59. A liquid crystal device, comprising plural volumes of liquid crystal material, said liquid crystal material having a natural structure which in the absence of a prescribed input is distorted by surface means defining said volumes, whereby in response to such distortion said volumes of liquid crystal material at least one of scatter or absorb light, and further comprising input means for supplying as a prescribed input to said volumes of liquid crystal material first and second electrical signals, each having at least one of a relatively low and a relatively high frequency component that is respectively additive to apply a resultant field to such volumes of liquid crystal material.

60. The device of claim 59, in which each signal alone is of inadequate amplitude to effect a responsive alignment of liquid crystal structure.

61. The device of claim 60, wherein said input means includes phase shifting means for shifting the phase of at least one of said signals relative to the phase of the other of said signals.

62. The device of claim 59, further comprising one color pheochroic dye in a first plurality of said volumes of liquid crystal material.

63. The device of claim 62, further comprising a different color pleochroic dye in a second plurality of said volumes of liquid crystal material, at least some of said volumes of said first and second pluralities of volumes being optically serially aligned for subtractive color operation.

64. A liquid crystal apparatus comprising a composite layer containing two or more liquid crystal compositions that respond differently to a prescribed input, and input means for applying such prescribed input, said different response being a sign of dielectric anisotropy.

65. The apparatus of claim 64, said different response being absorption of light.

66. A liquid crystal apparatus comprising two or more liquid crystal compositions placed in intimate but non-mixing relation such that the liquid crystal compositions function in optical serial relation without parallax, said liquid crystal compositions being operative to discriminate at least one characteristic of such prescribed input, wherein a plurality of said liquid crystal compositions respectively have different size volumes of liquid crystal in a containment medium and are capable of discriminating as a function of such size.

67. A liquid crystal apparatus comprising a composite layer containing two or more liquid crystal compositions that respond differently to a prescribed input, and input means for applying such prescribed input; said different response being a sign of dielectric anisotropy, said input means comprising electrodes.

68. The apparatus of claim 67, said input means comprising a single pair of electrodes for addressing substantially all parts of said composite layer.

69. The apparatus of claim 67, said electrodes comprising one electrode on one side of said composite layer, one electrode on the other side of said composite layer, and one electrode between said composite layers for cooperating with both of said first-mentioned electrodes to apply electric field to respective liquid crystal compositions.

70. In combination, at least three groups of volumes of liquid crystal, each group comprising liquid crystal material, pleochroic dye of a respective color and a containment medium for containing therein said liquid crystal material and pleochroic dye, said volumes being aligned in optical series, and means for applying a prescribed input to at least some of said volumes to affect the filtering of light by the pleochroic dye therein, and wherein said groups are arranged in relatively close proximity to each other to achieve substantially parallax-free operation.

71. The combination of claim 70, wherein said dyes are cyan, magenta and yellow, respectively.

72. A liquid crystal device, comprising plural volumes of liquid crystal material and pleochroic dye in a containment medium, and non-pleochroic dye in at least one of said liquid crystal material and containment medium; said pleochroic dye and said non-pleochroic dye being complementary colors.

73. The device of claim 72, said liquid crystal material having comprising operationally nematic liquid crystal having a natural structure that in the absence of a prescribed input is distorted by a surface of said volumes whereupon said pleochroic dye and non-pleochroic dye cooperate to produce a black output; and said liquid crystal material being responsive to a prescribed input to undergo generally parallel alignment to reduce the affect of the pleochroic dye, whereby primary coloring of light transmitted through the device is a function of the color of said non-pleochroic dye.

74. A multicolor display comprising plural picture elements formed of the device of claim 73.

75. The device of claim 74, further comprising electrical means for selectively providing electric field to selected picture elements.

76. An optical switch, comprising plural volumes of liquid crystal material in a containment medium, pleochroic dye in said liquid crystal, and non-pleochroic dye in at least one of said liquid crystal and containment medium, said dyes being of complementary colors, and input means for applying a prescribed input to said liquid crystal material to determine the transmission of light by the switch.

77. An optical device, comprising plural groups of volumes of liquid crystal in a containment medium, a plurality of such groups containing in the volumes thereof respective pleochroic dye to color light transmitted therethrough, said volumes being arranged relative to each other in generally optically serial relation to affect color of light transmitted therethrough in a substractive color operation, and further comprising a layer of a plurality of volumes of liquid crystal and pleochroic dye, said layer being more proximately exposed to a source of external optical radiation than another said other groups of volumes of liquid crystal in a containment medium, and the liquid crystal in said more proximately exposed layer includes pleochroic dye that removes at least a substantial amount of ultraviolet optical radiation from such optical radiation emitted by such source prior to passing such optical radiation to other groups of volumes.

78. An optical device, comprising plural groups of volumes of liquid crystal in a containment medium, a plurality of such groups containing in the volumes thereof respective pleochroic dye to color light transmitted therethrough, said volumes being arranged relative to each other in generally optically serial relation to affect color of light transmitted therethrough in a subtractive color operation, and wherein said liquid crystal material in a plurality of said groups having a relatively low difference between the ordinary and extraordinary indices of refraction and such indices being substantially matched to the index of refraction of such containment medium.

79. The device of claim 78, wherein one group of volumes includes black pleochroic dye, and said liquid crystal material in said one group has a relatively high difference between the ordinary and extraordinary indices of refraction and the ordinary index of refraction of such liquid crystal material being substantially matched to the index of refraction of said containment medium of such group.

* * * * *